(12) United States Patent
Awazu et al.

(10) Patent No.: US 12,386,241 B2
(45) Date of Patent: Aug. 12, 2025

(54) IMAGING DEVICE AND SHAKE SUPPRESSION METHOD

(71) Applicant: FUJIFILM Corporation, Tokyo (JP)

(72) Inventors: Kouhei Awazu, Saitama (JP); Masakuni Sugita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 170 days.

(21) Appl. No.: 18/175,399

(22) Filed: Feb. 27, 2023

(65) Prior Publication Data

US 2023/0205051 A1 Jun. 29, 2023

Related U.S. Application Data

(63) Continuation of application No. PCT/JP2021/030229, filed on Aug. 18, 2021.

(30) Foreign Application Priority Data

Sep. 28, 2020 (JP) .................. 2020-162677

(51) Int. Cl.
*G03B 9/24* (2021.01)
*G02B 27/64* (2006.01)
*H04N 23/68* (2023.01)

(52) U.S. Cl.
CPC ............. *G03B 9/24* (2013.01); *G02B 27/646* (2013.01); *H04N 23/682* (2023.01)

(58) Field of Classification Search
CPC .... G03B 2205/0007; G03B 2205/0038; G03B 5/02
See application file for complete search history.

(56) References Cited

U.S. PATENT DOCUMENTS

| 2016/0139492 A1 | 5/2016 | Kamada |
| 2021/0152720 A1* | 5/2021 | Awazu ................ G03B 9/36 |
| 2021/0227140 A1* | 7/2021 | Ohishi ................ G02B 7/10 |

FOREIGN PATENT DOCUMENTS

| JP | S54-107334 A | 8/1979 |
| JP | H06-67259 A | 3/1994 |

(Continued)

OTHER PUBLICATIONS

International Search Report issued in PCT/JP2021/030229; mailed Nov. 16, 2021.

(Continued)

*Primary Examiner* — Noam Reisner
(74) *Attorney, Agent, or Firm* — Studebaker Brackett PLLC

(57) ABSTRACT

An imaging device that includes a shutter unit including a shutter adjusting an amount of subject light incident on an image sensor through an imaging optical system. The shutter unit being mounted on a frame. The at least three or more elastic members are disposed on an outer periphery of a contour of the shutter unit in a front view and press the shutter unit from the frame to support the shutter unit, each of the at least three or more elastic members is elastically deformed in a first direction that is a direction in which each of the at least three or more elastic members presses the shutter unit from the frame and a second direction that is a direction perpendicular to the first direction, and the first directions of the at least three or more elastic members intersect with each other at a specific spot inside the contour.

19 Claims, 11 Drawing Sheets

(56) References Cited

FOREIGN PATENT DOCUMENTS

| | | | |
|---|---|---|---|
| JP | 2011-107439 A | 6/2011 | |
| JP | 2016-099427 A | 5/2016 | |
| WO | WO-2020021956 A1 * | 1/2020 | ............... G03B 9/36 |

OTHER PUBLICATIONS

International Preliminary Report on Patentability (Chapter I) and Written Opinion of the International Searching Authority issued in PCT/JP2021/030229; issued Mar. 28, 2023.

An Office Action; "Notice of Reasons for Refusal," mailed by the Japanese Patent Office on Nov. 21, 2023, which corresponds to Japanese Patent Application No. 2022-551195 and is related to U.S. Appl. No. 18/175,399; with English language translation.

An Office Action; "Notice of Reasons for Refusal," mailed by the Japanese Patent Office on Feb. 12, 2025, which corresponds to Japanese Patent Application No. 2024-052380 and is related to U.S. Appl. No. 18/175,399; with English language translation.

\* cited by examiner

IMAGING DEVICE AND SHAKE SUPPRESSION METHOD

CROSS-REFERENCE TO RELATED APPLICATIONS

This application is a continuation application of International Application No. PCT/JP2021/030229, filed Aug. 18, 2021, the disclosure of which is incorporated herein by reference in its entirety. Further, this application claims priority under 35 USC 119 from Japanese Patent Application No. 2020-162677 filed Sep. 28, 2020, the disclosure of which is incorporated by reference herein.

BACKGROUND

1. Technical Field

The present disclosure relates to an imaging device and a shake suppression method.

2. Related Art

A shake correction camera disclosed in JP2011-107439A comprises an imaging optical system, an imaging element, a shake correction unit, an imaging controller, an imaging body part that includes a shutter button and a shutter spring, a frame that supports the imaging body part to allow the imaging body part to move rotationally, and a support spring that is held by the frame and supports the imaging body part.

An imaging device disclosed in WO2020/021956A comprises an imaging element that is provided in a device body and comprises an imaging surface orthogonal to an optical axis of light forming an optical image, and a shutter unit that adjusts the amount of light incident on the imaging element. The shutter unit includes a support member and a shutter member that is provided in the device body. The shutter member is supported by the support member and is moved in a direction orthogonal to the optical axis together with the support member. The imaging device disclosed in WO2020/021956A further comprises a camera shake correction unit that is provided in a device body and moves an imaging element in a direction orthogonal to the optical axis to correct the amount of camera shake, and a plurality of elastic members that are disposed on at least one side and the other side of imaginary straight line passing through a centroid of the shutter unit and orthogonal to the optical axis as viewed in the direction of an optical axis and that is in contact with the device body and the support member.

SUMMARY

An embodiment according to a technique of the present disclosure provides an imaging device and a shake suppression method that can achieve both the suppression of vibration caused by the operation of a shutter and the holding of the position of a shutter unit with high accuracy.

An imaging device according to a first aspect of the technique of the present disclosure includes a shutter unit including a shutter adjusting an amount of subject light incident on an image sensor through an imaging optical system, and the shutter unit being mounted on a frame. The imaging device comprises at least three or more elastic members. The at least three or more elastic members are disposed on an outer periphery of a contour of the shutter unit in a front view and press the shutter unit from the frame to support the shutter unit, each of the at least three or more elastic members is elastically deformed in a first direction that is a direction in which each of the at least three or more elastic members presses the shutter unit from the frame and a second direction that is a direction perpendicular to the first direction, and the first directions of the at least three or more elastic members intersect with each other at a specific spot inside the contour.

According to a second aspect of the technique of the present disclosure, in the imaging device according to a first aspect, the at least three or more elastic members are disposed at spots that form a polygon of which vertices correspond to respective positions of the at least three or more elastic members, and the specific spot is positioned inside the polygon.

According to a third aspect of the technique of the present disclosure, in the imaging device according to the second aspect, an interval between adjacent vertices of the polygon is an interval less than 180° in a circumferential direction around the specific spot in the front view.

According to a fourth aspect of the technique of the present disclosure, the imaging device according to any one of the first to third aspects further comprises a shake correction mechanism that moves the image sensor in a plane perpendicular to an optical axis of the imaging optical system to correct a shake, and the shake correction mechanism is mounted on the frame.

According to a fifth aspect of the technique of the present disclosure, in the imaging device according to any one of the first to fourth aspects, the imaging optical system is capable of being mounted on the frame, and the imaging optical system includes a vibration-proof lens that is moved in a plane perpendicular to an optical axis of the imaging optical system to correct a shake.

According to a sixth aspect of the technique of the present disclosure, in the imaging device according to any one of the first to fifth aspects, elastic forces of the at least three or more elastic members in the first direction are larger than elastic forces of the at least three or more elastic members in the second direction.

According to a seventh aspect of the technique of the present disclosure, in the imaging device according to any one of the first to sixth aspects, the shutter unit is supported from a side of the outer periphery by the at least three or more elastic members in a state where the shutter unit is oscillatable against elastic forces of the at least three or more elastic members.

According to an eighth aspect of the technique of the present disclosure, in the imaging device according to any one of the first to seventh aspects, the specific spot is one spot inside the contour.

According to a ninth aspect of the technique of the present disclosure, in the imaging device according to the eighth aspect, the one spot is a spot that coincides with a centroid of the shutter unit in the front view.

According to a tenth aspect of the technique of the present disclosure, in the imaging device according to the eighth aspect, the one spot is a centroid of the shutter unit.

According to an eleventh aspect of the technique of the present disclosure, in the imaging device according to any one of the first to tenth aspects, the first direction of at least one elastic member of the at least three or more elastic members coincides with a vertical direction in a case where the imaging device picks up an image in a standard posture.

According to a twelfth aspect of the technique of the present disclosure, in the imaging device according to any one of the first to eleventh aspects, the at least three or more elastic members are disposed between the frame and the shutter unit on the outer periphery in a state where the at least three or more elastic members are compressed in the first direction in a case where a position of the shutter unit is a reference position, and an amount of elastic deformation of the at least three or more elastic members in a case where the position of the shutter unit is the reference position is equal to or larger than a movable distance of the shutter unit.

According to a thirteenth aspect of the technique of the present disclosure, in the imaging device according to the twelfth aspect, a moving distance of the shutter unit in a vertical direction in a case where the imaging device picks up an image in a standard posture is equal to or less than the movable distance of the shutter unit.

According to a fourteenth aspect of the technique of the present disclosure, in the imaging device according to any one of the first to thirteenth aspects, the shutter unit includes a rotating member, the rotating member is connected to the shutter and is rotated to open and close the shutter, a rotational force caused by rotation of the rotating member is applied to the shutter unit, so that the shutter unit oscillates in the second direction, and elastic forces of the at least three or more elastic members are set to elastic forces that allow an oscillation amplitude of the shutter unit in the second direction to be less than a maximum oscillation amplitude of the shutter unit in the second direction.

According to a fifteenth aspect of the technique of the present disclosure, in the imaging device according to any one of the first to fourteenth aspects, the shutter is a focal plane shutter.

According to a sixteenth aspect of the technique of the present disclosure, in the imaging device according to any one of the first to fifteenth aspects, at least one of the at least three or more elastic members is a compression coil spring.

According to a seventeenth aspect of the technique of the present disclosure, the imaging device according to any one of the first to sixteenth aspects further comprises a holding mechanism that holds positions of end portions of the elastic members.

According to an eighteenth aspect of the technique of the present disclosure, in the imaging device according to the seventeenth aspect, the holding mechanism includes a first fastener and a first engaging member to be engaged with the first fastener, one of the first fastener and the first engaging member is provided on one of the frame and a first end portion of the elastic member, and the other of the first fastener and the first engaging member is provided on the other of the frame and the first end portion.

According to a nineteenth aspect of the technique of the present disclosure, in the imaging device according to the seventeenth or eighteenth aspect, the holding mechanism includes a second fastener and a second engaging member to be engaged with the second fastener, one of the second fastener and the second engaging member is provided on one of the shutter unit and a second end portion of the elastic member, and the other of the second fastener and the second engaging member is provided on the other of the shutter unit and the second end portion.

According to a twentieth aspect of the technique of the present disclosure, the imaging device according to any one of the first to nineteenth aspects further comprises a friction material that is interposed between the frame and the shutter unit and regulates misregistration between the frame and the shutter unit with a friction force.

According to a twenty-first aspect of the technique of the present disclosure, in the imaging device according to any one of the first to twentieth aspects, the specific spot is a predetermined range inside the contour, and the predetermined range is a range in which damping performance equivalent to damping performance of the at least three or more elastic members against the shutter unit, in a case where the specific spot is a centroid, is exhibited by adjustment of a modulus of elasticity of at least one elastic member of the at least three or more elastic members.

A shake suppression method according to a twenty-second aspect of the technique of the present disclosure is applied to an imaging device that includes a shutter unit including a shutter adjusting an amount of subject light incident on an image sensor through an imaging optical system, and at least three or more elastic members. The shutter unit being mounted on a frame. The shake suppression method comprises: disposing the at least three or more elastic members on an outer periphery of a contour of the shutter unit in a front view; causing the at least three or more elastic members to press the shutter unit from the frame to support the shutter unit; causing each of the at least three or more elastic members to be elastically deformed in a first direction that is a direction in which each of the at least three or more elastic members presses the shutter unit from the frame and a second direction that is a direction perpendicular to the first direction; and causing the first directions of the at least three or more elastic members to intersect with each other at a specific spot inside the contour.

BRIEF DESCRIPTION OF THE DRAWINGS

Exemplary embodiments of the technology of the disclosure will be described in detail based on the following figures, wherein.

DETAILED DESCRIPTION

Examples of an imaging device and a shake suppression method according to a technique of the present disclosure will be described below with reference to the accompanying drawings.

First, wording used in the following description will be described.

CPU is an abbreviation for "Central Processing Unit". RAM is an abbreviation for "Random Access Memory". NVM is an abbreviation for "Non-Volatile Memory". ASIC is an abbreviation for "Application Specific Integrated Circuit". PLD is an abbreviation for "Programmable Logic Device". FPGA is an abbreviation for "Field-Programmable Gate Array". CMOS is an abbreviation for "Complementary Metal Oxide Semiconductor". CCD is an abbreviation for "Charge Coupled Device". OIS is an abbreviation for "Optical Image Stabilization". BIS is an abbreviation for "Body Image Stabilization". QCD is an abbreviation for "Quality Cost Delivery".

In the description of this specification, "vertical" refers to "vertical" in the sense of including an error that is generally allowed in the technical field to which the technique of the present disclosure belongs and that is not contrary to the gist of the technology of the present disclosure, in addition to perfect vertical. Further, in the description of this specification, "orthogonal" refers to "orthogonal" in the sense of including an error that is generally allowed in the technical field to which the technique of the present disclosure belongs and that is not contrary to the gist of the technology of the present disclosure, in addition to perfect orthogonality. Furthermore, in the description of this specification, "parallel" refers to "parallel" in the sense of including an error that is generally allowed in the technical field to which the technique of the present disclosure belongs and that is not contrary to the gist of the technology of the present disclosure, in addition to perfect parallel. Moreover, in the description of this specification, "same" refers to "same" in the sense of including an error that is generally allowed in the technical field to which the technique of the present disclosure belongs and that is not contrary to the gist of the technology of the present disclosure, in addition to perfect same.

Figure 1:
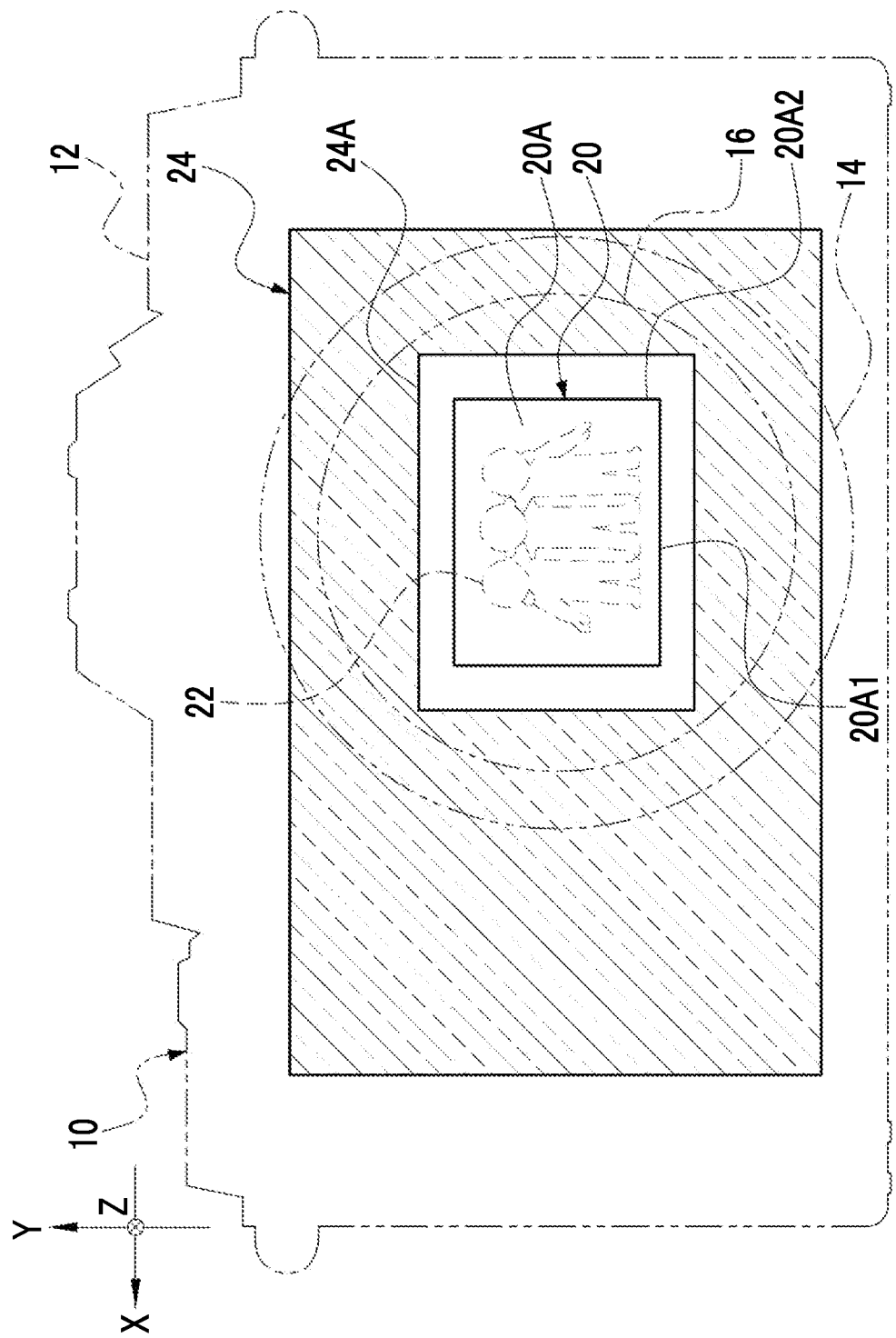
FIG. 1 is a schematic front view showing an example of an appearance in a case where a camera body, a shutter unit, and an image sensor are viewed from a front side of a digital camera.

For example, as shown in FIG. 1, a digital camera 10 is an example of an "imaging device" according to the technique of the present disclosure. The digital camera 10 may be a consumer digital camera, may be an industrial digital camera, or may be a military digital camera. Specific examples of the digital camera 10 include a digital single-lens reflex camera, a digital compact camera, a digital camera mounted on a smart device (for example, a smartphone), a monitoring camera, and the like.

The digital camera 10 comprises a camera body 12. A lens mount 14 is provided on the front surface of the camera body 12. The lens mount 14 includes an aperture 16. The aperture 16 has a circular shape in a case where the digital camera 10 is viewed from the front side. An interchangeable imaging lens 18 (see FIG. 2) is attachably and detachably mounted on the lens mount 14.

An image sensor 20 is mounted on the camera body 12. The image sensor 20 is a CMOS image sensor. The image sensor 20 includes an imaging surface 20A. The imaging surface 20A is disposed at a spot facing the aperture 16, and is exposed to the outside through the aperture 16. Subject light indicating a subject is incident on the inside of the camera body 12 through the aperture 16, and is received by the imaging surface 20A. A plurality of photosensitive pixels are two-dimensionally arranged on the imaging surface 20A. In an example shown in FIG. 1, the imaging surface 20A is formed in a rectangular shape as viewed from the front side of the digital camera 10. The subject light forms an image on the imaging surface 20A via the imaging lens 18, so that an optical image 22 is formed.

The CMOS image sensor 20 photoelectrically converts the subject light received by the imaging surface 20A, and outputs electrical signals, which are obtained from photoelectric conversion, as image signals. An output destination of the image signals is, for example, a storage device, a display, and the like (not shown). The storage device holds the image signals, and the display displays an image (an image showing the subject) based on the image signals.

In the example shown in FIG. 1, the rectangular shape of the imaging surface 20A viewed from the front side of the digital camera 10 is formed by two sides 20A1 that are opposite sides and two sides 20A2 that are opposite sides. The sides 20Al are sides of the imaging surface 20A in a longitudinal direction, and the sides 20A2 are sides of the imaging surface 20A in a lateral direction. In the example shown in FIG. 1, the image sensor 20 is provided in the camera body 12 such that the sides 20Al are parallel to a horizontal plane and the sides 20A2 are parallel to a vertical plane. The posture of the digital camera 10 in a case where the sides 20A1 are parallel to the horizontal plane and the sides 20A2 are parallel to the vertical plane as described above will be also referred to as "standard posture" in the following description.

Here, the definition of the standard posture is merely an example. For example, the posture of the digital camera 10 in a case where the sides 20A2 are parallel to the horizontal plane and the sides 20A1 are parallel to the vertical plane can also be defined as "standard posture", and which posture of the digital camera 10 is to be a standard posture may be appropriately defined.

Further, in the following description, for convenience of description, a direction parallel to the sides 20Al will be referred to as an X direction, a direction parallel to the sides 20A2 will be referred to as a Y direction, and a depth direction of the camera body 12 viewed from the front, that is, a direction perpendicular to both the X direction and the Y direction will be referred to as an Z direction.

A shutter unit 24 is mounted on the camera body 12. The shutter unit 24 is disposed between the lens mount 14 and the image sensor 20 in the Z direction. The shutter unit 24 includes an aperture 24A. The aperture 24A is formed at a spot facing the imaging surface 20A as viewed in the Z direction. The aperture 24A is formed to have a size fit for the imaging surface 20A as viewed in the Z direction. An aperture formed in a rectangular shape larger than the outer contour of the imaging surface 20A as viewed from in the Z direction is shown in the example shown in FIG. 1 as one example of the aperture 24A.

Figure 2:
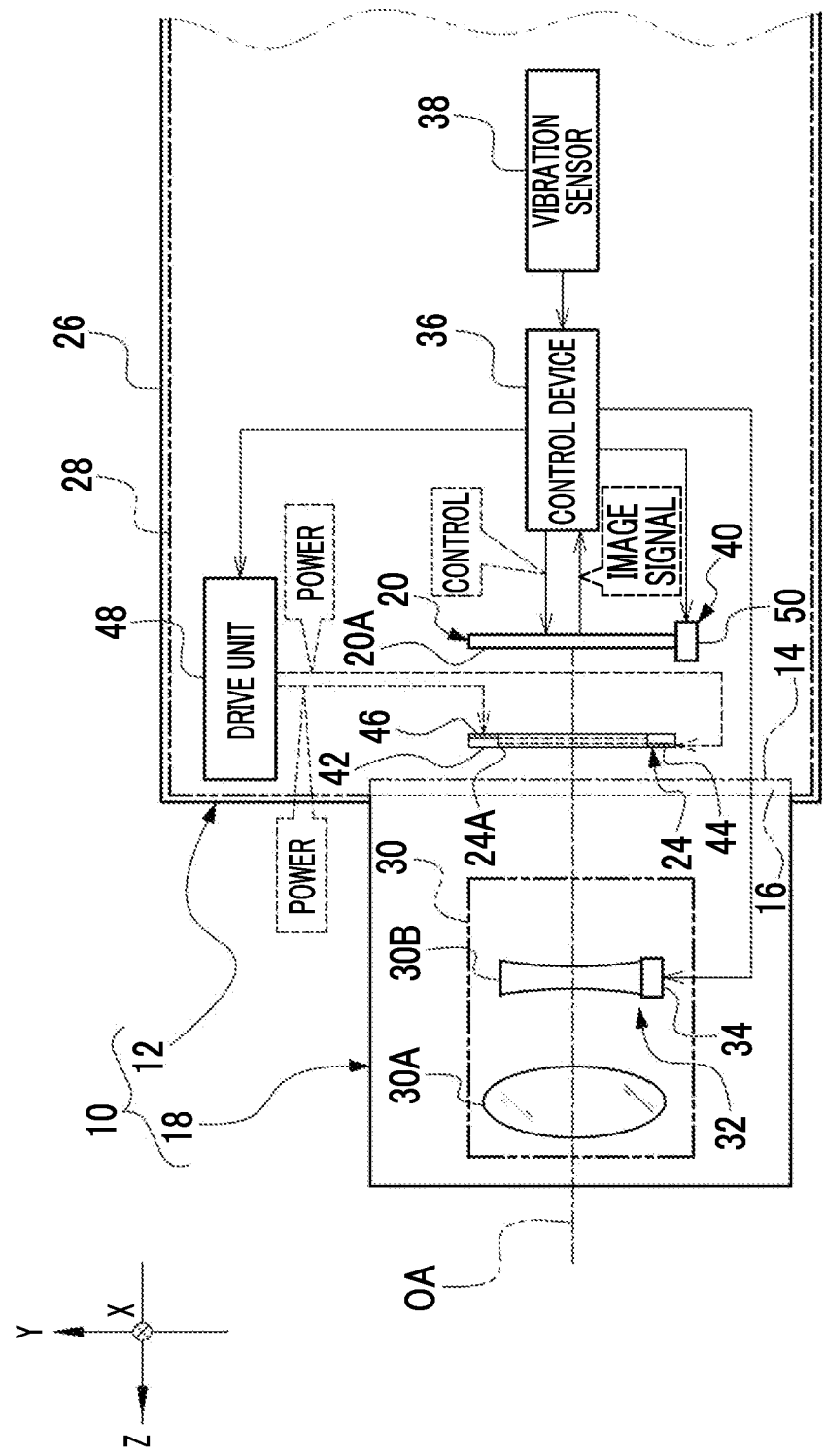
FIG. 2 is a conceptual diagram showing an example of the hardware configuration of an optical system and an electrical system of the digital camera.

For example, as shown in FIG. 2, the camera body 12 comprises an exterior frame 26. A holding frame 28 is housed in the exterior frame 26. The holding frame 28 is an example of a "frame" according to the technique of the present disclosure. The holding frame 28 is a frame holding various devices, and is fixed to the inner wall of the exterior frame 26.

The holding frame 28 includes the lens mount 14. In an example shown in FIG. 2, the imaging lens 18 is mounted on the lens mount 14. The imaging lens 18 includes an imaging optical system 30. The imaging optical system 30 includes a plurality of optical elements. Examples of the plurality of optical elements include a plurality of lenses and stops (not shown). In the example shown in FIG. 2, an objective lens 30A and a vibration-proof lens 30B are shown as an example of the plurality of lenses. The objective lens 30A and the vibration-proof lens 30B are arranged from the subject toward the image sensor 20 along an optical axis OA in the order of the objective lens 30A and the vibration-proof lens 30B. Subject light is transmitted through the objective lens 30A and the vibration-proof lens 30B and forms an image on the imaging surface 20A.

Incidentally, in the digital camera 10, a shake occurs due to vibration applied to the digital camera 10 (hereinafter, also simply referred to as vibration). In the present embodiment, "shake" refers to a phenomenon in which a subject image to be formed on the imaging surface 20A is changed since the optical axis OA is tilted with respect to a reference axis due to vibration. For example, "reference axis" mentioned here refers to the optical axis OA in a state where vibration is not applied. Examples of the subject image include the optical image 22 (see FIG. 1) and an electron image (not shown). The electron image is, for example, an electronic image based on image signals. The subject image is changed as a positional relationship between the optical axis OA and the imaging surface 20A is changed.

The digital camera 10 comprises an optical shake correction mechanism 32 to correct a shake. In the example shown in FIG. 2, the optical shake correction mechanism 32 is mounted on the imaging lens 18. The optical shake correction mechanism 32 comprises a vibration-proof lens 30B, an actuator 34, and the like, and moves the vibration-proof lens 30B to optically correct a shake. In the present embodiment, "correcting a shake" includes not only the meaning of removing a shake but also the meaning of reducing a shake.

In the present embodiment, OIS is employed as one of methods of correcting a shake using the optical shake correction mechanism 32. OIS refers to a method of correcting a shake by moving the vibration-proof lens 30B on the basis of vibration data obtained in a case where vibration is detected by a vibration sensor 38 (described later). Specifically, the vibration-proof lens 30B is moved by the amount of shake to be canceled in a direction in which a shake is canceled in a plane perpendicular to the optical axis OA, that is, a plane defined by the X direction and the Y direction (hereinafter, also referred to as "XY plane"), so that the shake is corrected.

The actuator 34 is mounted on the vibration-proof lens 30B. The actuator 34 is a shift mechanism on which a coil motor is mounted, and moves the vibration-proof lens 30B in a direction perpendicular to the optical axis of the vibration-proof lens 30B in a case where the coil motor is driven. Here, the shift mechanism on which the coil motor is mounted is exemplified as the actuator 34. However, the technique of the present disclosure is not limited thereto and another drive source, such as a stepping motor or a piezoelectric element, may be applied instead of the coil motor.

The holding frame 28 houses the image sensor 20, the shutter unit 24, a control device 36, a vibration sensor 38, and a camera body-side shake correction mechanism 40. Further, the image sensor 20, the shutter unit 24, the control device 36, the vibration sensor 38, and the camera body-side shake correction mechanism 40 are fixed to the holding frame 28. Here, the camera body-side shake correction mechanism 40 is an example of a "shake correction mechanism" according to the technique of the present disclosure.

The control device 36 controls the entire digital camera 10. The control device 36 is implemented by a computer-based device that includes a CPU, a RAM, and a NVM. An aspect in which the control device 36 is implemented by a computer-based device is described here. However, the control device 36 is not limited to the technique of the present disclosure, and may be a device including ASIC, FPGA, and/or PLD or may be implemented by a combination of hardware configuration and software configuration.

The control device 36 is connected to the image sensor 20, and controls the operation of the image sensor 20 or acquires image signals from the image sensor 20.

The vibration sensor 38 is a device including a gyro sensor, and detects vibration applied to the digital camera 10. Examples of the vibration applied to the digital camera 10 include vibration that is applied to the digital camera 10 by a user who is gripping the digital camera 10, vibration that is applied to the digital camera 10 installed on a support table, such as a tripod, by wind, vibration that is applied from a vehicle, and the like. The control device 36 is connected to the vibration sensor 38 and acquires a detection result of the vibration sensor 38.

The shutter unit 24 adjusts the amount of subject light, which is incident through the imaging optical system 30, by a focal plane shutter system. The shutter unit 24 comprises a shutter frame 42, a front curtain 44, a rear curtain 46, and a drive unit 48. The aperture 24A is formed in the shutter frame 42. The shutter frame 42 houses and holds the front curtain 44 and the rear curtain 46 that are an example of a "focal plane shutter" according to the technique of the present disclosure. Each of the front curtain 44 and the rear curtain 46 comprises a plurality of blades, and adjusts the amount of subject light incident through the imaging optical system 30 in a case where the plurality of blades are operated. The front curtain 44 is disposed closer to the subject than the rear curtain 46 in the shutter frame 42.

A state where the front curtain 44 and the rear curtain 46 are fully opened is shown in the example shown in FIG. 2. In a fully open state, the plurality of blades of the front curtain 44 are housed in the shutter frame 42 to overlap with a lower edge portion of the shutter frame 42 and the plurality of blades of the rear curtain 46 are housed in the shutter frame 42 to overlap with an upper edge portion of the shutter frame 42.

Figure 3:
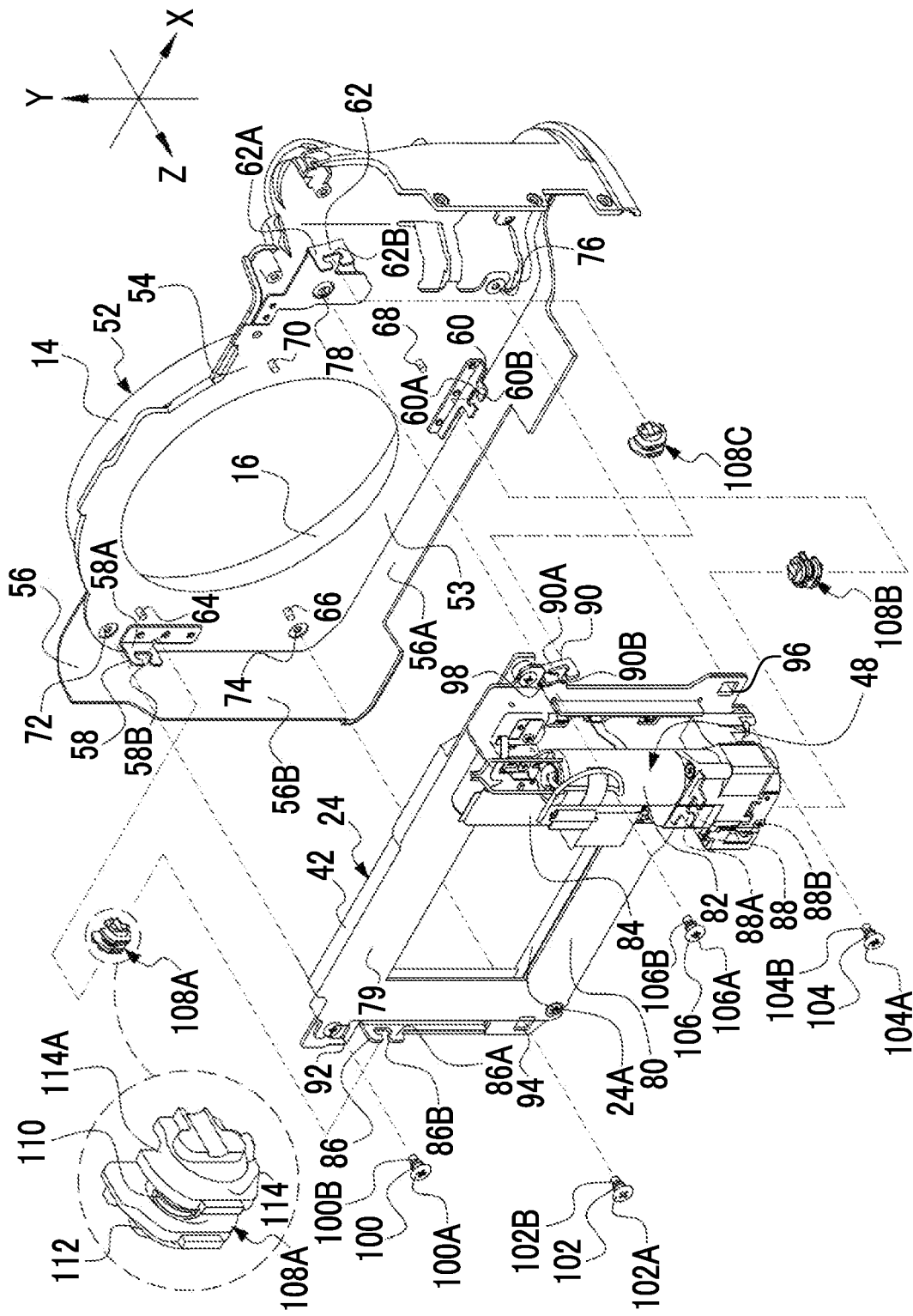
FIG. 3 is a schematic perspective view showing an example of the back configuration of a front frame and a shutter unit.
Figure 4:
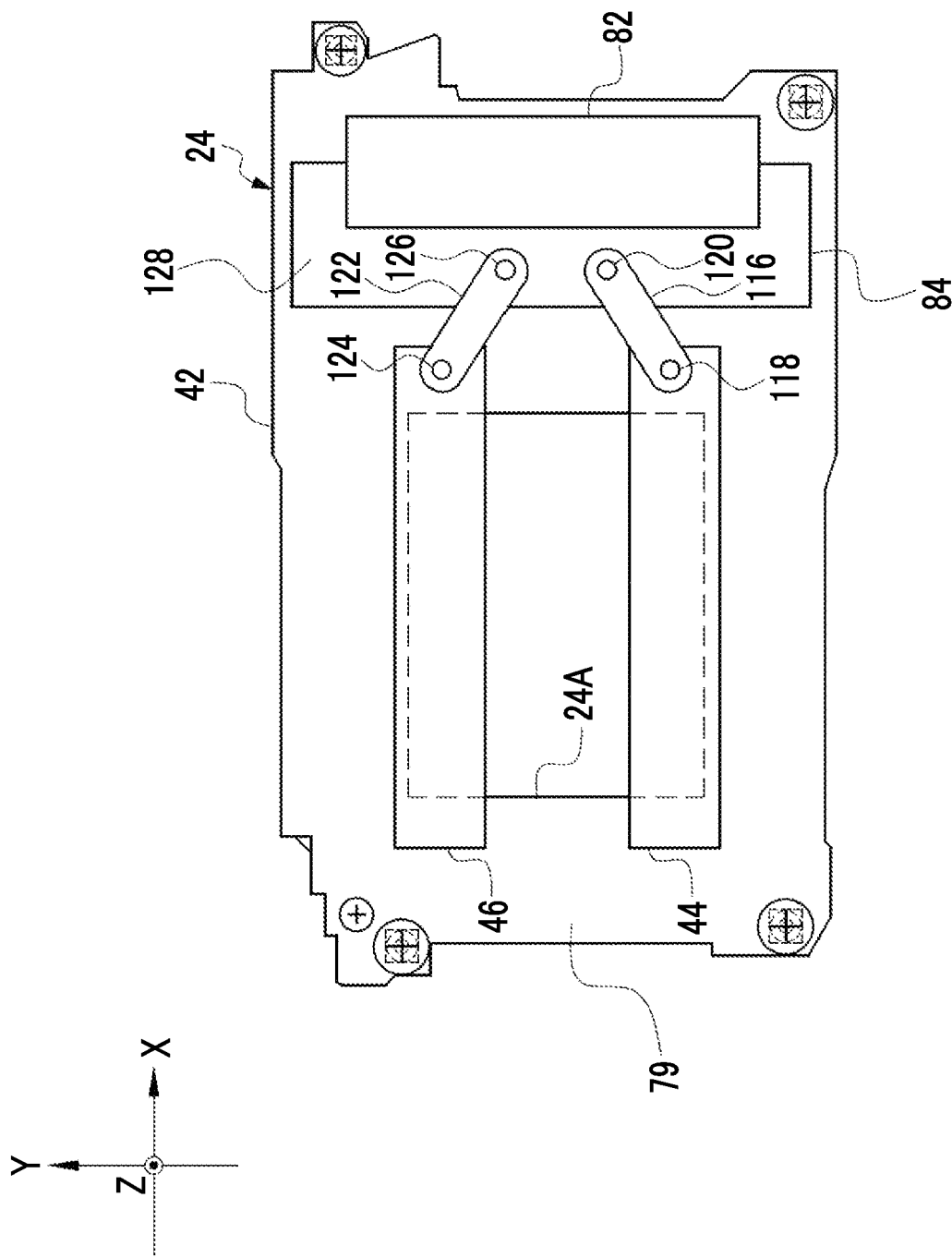
FIG. 4 is a schematic back view showing an example of the configuration of the shutter unit in a case where the shutter unit is viewed from the back side of the digital camera.
Figure 5:
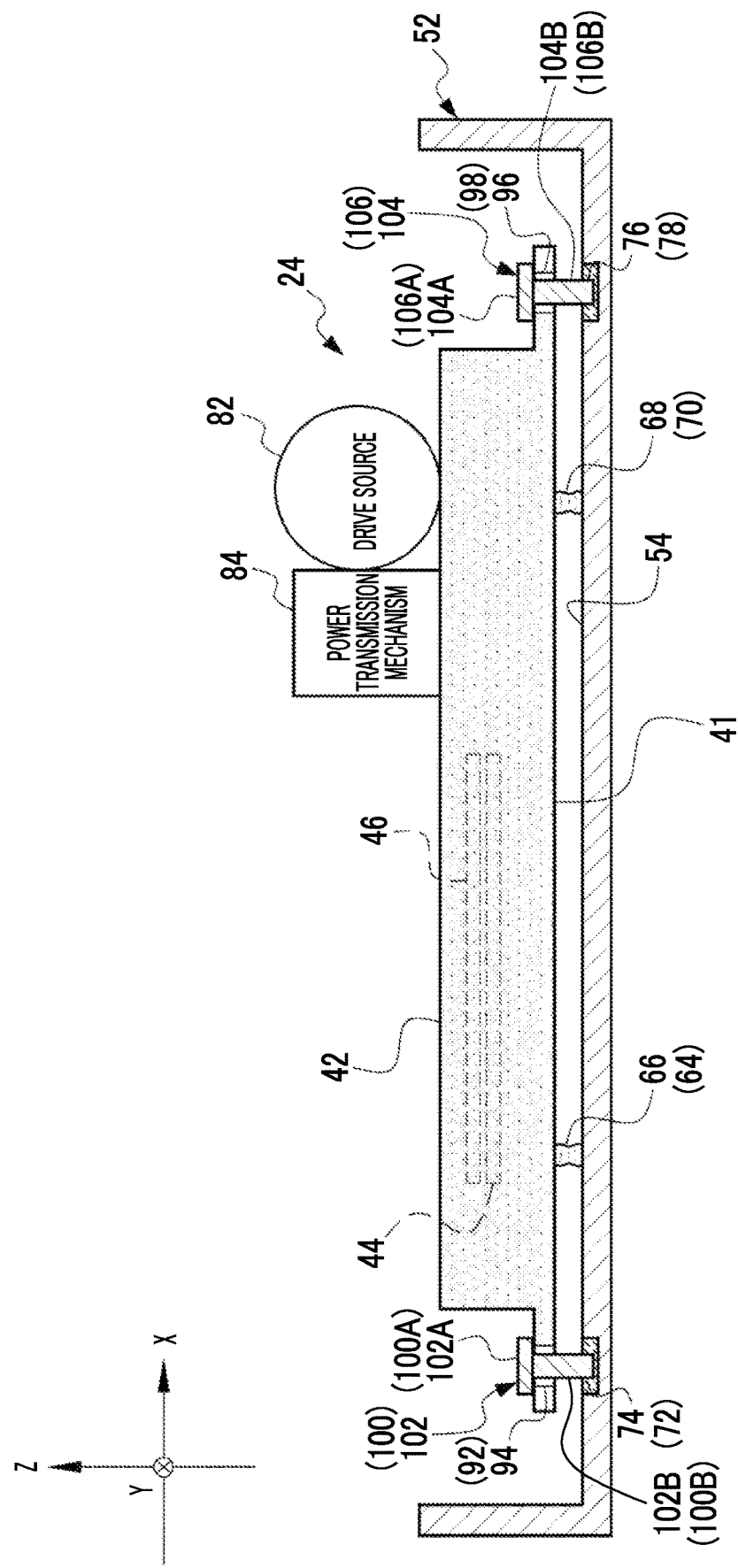
FIG. 5 is a schematic bottom view showing an example of the configuration of the front frame and the shutter unit in a case where an aspect in which the shutter unit is mounted on the front frame is viewed from the bottom side of the digital camera.

The drive unit 48 comprises a drive source 82 (see FIGS. 3 to 5) and a power transmission mechanism 84 (see FIGS. 3 to 5). Examples of the drive source 82 include a solenoid. The drive source 82 is not limited to a solenoid, and may be a combination of a solenoid and a motor or another type of drive source, such as a motor. Further, examples of the power transmission mechanism 84 include a mechanism that includes a plurality of gears, a link mechanism, and the like. The power transmission mechanism 84 is a mechanism that transmits power generated by the drive source 82 to the front curtain 44 and the rear curtain 46. The drive unit 48 is connected to the control device 36. Specifically, the drive source 82 of the drive unit 48 is connected to the control device 36, and the drive source 82 generates power under the control of the control device 36.

The front curtain 44 and the rear curtain 46 are mechanically connected to the drive unit 48. The drive unit 48 generates power for a front curtain under the control of the control device 36, and applies the generated power for a front curtain to the front curtain 44 to selectively pull up and down the front curtain 44. Further, the drive unit 48 generates power for a rear curtain under the control of the control device 36, and applies the generated power for a rear curtain to the rear curtain 46 to selectively pull up and down the rear curtain 46.

The camera body-side shake correction mechanism 40 is a mechanism that corrects a shake by a BIS system. BIS refers to a method of correcting a shake by moving the vibration-proof lens 30B on the basis of vibration data obtained in a case where vibration is detected by the vibration sensor 38.

The camera body-side shake correction mechanism 40 comprises an actuator 50 to realize the correction of a shake in the BIS system. The actuator 50 is provided in the image sensor 20 and is fixed to the holding frame 28. The actuator 50 is connected to the control device 36, and is operated under the control of the control device 36. The actuator 50 is a shift mechanism on which a coil motor is mounted, and moves the image sensor 20 in a case where the coil motor is driven in accordance with an instruction given from the control device 36. Specifically, the control device 36 acquires a detection result of the vibration sensor 38, and controls the actuator 50 on the basis of the acquired result to move the image sensor 20 by the amount of shake to be canceled in a direction in which a shake is canceled in the XY plane.

The control device 36 is also connected to the actuator 34 of the optical shake correction mechanism 32. The actuator 34 is operated under the control of the control device 36. That is, the actuator 34 moves the vibration-proof lens 30B in a case where the coil motor is driven in accordance with an instruction given from the control device 36. Specifically, the control device 36 acquires a detection result of the vibration sensor 38, and controls the actuator 34 on the basis of the acquired result to move the vibration-proof lens 30B by the amount of shake to be canceled in a direction in which a shake is canceled in the XY plane.

The holding frame 28 is a frame that is formed of a combination of a plurality of frames. Examples of the plurality of frames include a front frame 52 (see FIG. 3) and a back frame (not shown). The back frame is assembled to the front frame 52, so that the holding frame 28 is formed.

For example, as shown in FIG. 3, the front frame 52 includes the lens mount 14 and the aperture 16 is formed in the lens mount 14. A flat surface 54 parallel to the XY plane is formed on a back surface 53 of the front frame 52. A side wall 56 is formed at an outer peripheral edge of the flat surface 54. The side wall 56 extends to the back side of the digital camera 10 in the Z direction, and is formed integrally with the flat surface 54. The side wall 56 is roughly classified into a lower wall 56A and a left wall 56B. The lower wall 56A extends to the back side of the digital camera 10 in the Z direction from a lower edge portion of the outer peripheral edge of the flat surface 54 as viewed from the back side of the digital camera 10. The left wall 56B extends to the back side of the digital camera 10 in the Z direction from a left edge portion of the outer peripheral edge of the flat surface 54 as viewed from the back side of the digital camera 10.

Brackets 58, 60, and 62 are erected on the back surface 53. The bracket 58 is formed in the shape of a thin plate, and is disposed at an upper left portion in a case where the flat surface 54 is viewed from the back side of the digital camera 10. The bracket 58 stands perpendicular to the flat surface 54. In other words, the bracket 58 extends from the flat surface 54 to the back side of the digital camera 10 in the Z direction. A wide surface 58A among surfaces of the bracket 58 is a flat surface parallel to a plane defined by the Y direction and the Z direction (hereinafter, also referred to as "YZ plane"). The bracket 58 includes a notch 58B. The notch 58B is formed from the back side of the digital camera 10 to the middle portion of the bracket 58 to have a wide shape with steps.

The bracket 60 is formed in the shape of a thin plate, and is disposed at a lower right portion in a case where the flat surface 54 is viewed from the back side of the digital camera 10. The bracket 60 stands perpendicular to the flat surface 54. In other words, the bracket 60 extends from the flat surface 54 to the back side of the digital camera 10 in the Z direction. A wide surface 60A among surfaces of the bracket 60 is a flat surface parallel to a plane defined by the X direction and the Z direction (hereinafter, also referred to as "XZ plane"). The bracket 60 includes a notch 60B. The notch 60B is formed from the back side of the digital camera 10 to the middle portion of the bracket 60 to have a wide shape with steps.

The bracket 62 is formed in the shape of a thin plate, and is disposed at an upper right portion in a case where the back surface 53 of the front frame 52 is viewed from the back side of the digital camera 10. The bracket 62 stands perpendicular to the flat surface 54. In other words, the bracket 62 extends from the back surface 53 to the back side of the digital camera 10 in the Z direction. A wide surface 62A among surfaces of the bracket 62 is a flat surface inclined downward from an upper right portion, which is determined in a case where the back surface 53 of the front frame 52 is viewed from the back side of the digital camera 10, to the right side in a back view of the digital camera 10. The bracket 62 includes a notch 62B. The notch 62B is formed from the back side of the digital camera 10 to the middle portion of the bracket 62 to have a wide shape with steps.

Friction materials 64, 66, 68, and 70 are erected on the flat surface 54. The friction materials 64, 66, 68, and 70 are interposed between the front frame 52 and the shutter unit 24, and regulate misregistration between the front frame 52 and the shutter unit 24 with a friction force. Here, a columnar sponge is used as an example of each of the friction materials 64, 66, 68, and 70.

The friction material 64 is disposed at an upper left portion in a case where the flat surface 54 is viewed from the back side of the digital camera 10, and one end of the friction material 64 is fixed to the flat surface 54. The friction material 66 is disposed at a lower left portion in a case where the flat surface 54 is viewed from the back side of the digital camera 10, and one end of the friction material 66 is fixed to the flat surface 54. The friction material 68 is disposed at a lower right portion in a case where the flat surface 54 is viewed from the back side of the digital camera 10, and one end of the friction material 68 is fixed to the flat surface 54. The friction material 70 is disposed at an upper right portion in a case where the flat surface 54 is viewed from the back side of the digital camera 10, and one end of the friction material 70 is fixed to the flat surface 54. The friction materials 64, 66, 68, and 70 protrude from the flat surface 54 to the back side of the digital camera 10 in the Z direction. The height of each of the friction materials 64, 66, 68, and 70 in the Z direction is a height that allow each of the friction materials 64, 66, 68, and 70 to be in pressure contact with a front surface 41 of the shutter unit 24 (see FIG. 5) in a case where the shutter unit 24 is fitted to the front frame 52.

A columnar sponge is exemplified as an example of each of the friction materials 64, 66, 68, and 70, but the technique of the present disclosure is not limited thereto. For example, the shape of at least one of the friction material 64, 66, 68, or 70 may be another shape, such as a prismatic shape. Further, at least one of the friction material 64, 66, 68, or 70 may be rubber or may be another material, and may be any material as long as the misregistration between the front frame 52 and the shutter unit 24 can be regulated with a friction force.

Female screws 72, 74, 76, and 78 are formed on the back surface 53 of the front frame 52. The female screw 72 is disposed at an upper left portion of the back surface 53 in the back view of the digital camera 10. The female screw 74 is disposed at a lower left portion of the back surface 53 in the back view of the digital camera 10. The female screw 76 is disposed at a lower right portion of the back surface 53 in the back view of the digital camera 10. The female screw 78 is disposed at an upper right portion of the back surface 53 in the back view of the digital camera 10.

A flat surface 80 parallel to the XY plane is formed on a back surface 79 of the shutter frame 42 of the shutter unit 24. The drive unit 48 is mounted on the flat surface 80. The drive unit 48 is disposed on the right side of the aperture 24A in the back view of the digital camera 10. The drive unit 48 includes a drive source 82 and a power transmission mechanism 84. The power transmission mechanism 84 is disposed at a spot adjacent to the aperture 24A on the right side of the aperture 24A in the back view of the digital camera 10. The drive source 82 is mechanically connected to the power transmission mechanism 84, and power generated by the drive source 82 is transmitted to the power transmission mechanism 84.

Brackets 86, 88, and 90 are erected on the back surface 79. The bracket 86 is formed in the shape of a thin plate, and is disposed at an upper left portion in a case where the back surface 79 is viewed from the back side of the digital camera 10. The shape and size of the bracket 86 are the same as the shape and size of the bracket 58. A wide surface 86A among surfaces of the bracket 86 is a flat surface parallel to the YZ plane. The bracket 86 includes a notch 86B. The notch 86B is formed from the back side of the digital camera 10 to the middle portion of the bracket 86 to have a wide shape with steps. The shape and size of the notch 86B are the same as the shape and size of the notch 58B of the bracket 58.

In a case where the shutter unit 24 is fitted to the front frame 52, the bracket 58 is positioned outside the shutter unit 24, the surface 58A of the bracket 58 and the surface 86A of the bracket 86 face each other in parallel to each other, and the orientation and position of the notch 86B of the bracket 58 coincide with the orientation and position of the notch 86B of the bracket 86.

The bracket 88 is formed in the shape of a thin plate, and is disposed at a lower right portion in a case where the back surface 79 is viewed from the back side of the digital camera 10. The shape and size of the bracket 88 are the same as the shape and size of the bracket 60. A wide surface 88A among surfaces of the bracket 88 is a flat surface parallel to the XZ plane. The bracket 88 includes a notch 88B. The notch 88B is formed from the back side of the digital camera 10 to the middle portion of the bracket 88 to have a wide shape with steps. The shape and size of the notch 88B are the same as the shape and size of the notch 60B of the bracket 60.

In a case where the shutter unit 24 is fitted to the front frame 52, the bracket 60 is positioned outside the shutter unit 24, the surface 60A of the bracket 60 and the surface 88A of the bracket 88 face each other in parallel to each other, and the orientation and position of the notch 60B of the bracket 60 coincide with the orientation and position of the notch 88B of the bracket 88.

The bracket 90 is formed in the shape of a thin plate, and is disposed at an upper right portion in a case where the back surface 79 is viewed from the back side of the digital camera 10. The shape and size of the bracket 90 are the same as the shape and size of the bracket 62. A wide surface 90A among surfaces of the bracket 90 is a flat surface inclined downward from an upper right portion, which is determined in a case where the back surface 79 is viewed from the back side of the digital camera 10, to the right side in the back view of the digital camera 10. The bracket 90 includes a notch 90B. The notch 90B is formed from the back side of the digital camera 10 to the middle portion of the bracket 90 to have a wide shape with steps. The shape and size of the notch 90B are the same as the shape and size of the notch 62B of the bracket 62.

In a case where the shutter unit 24 is fitted to the front frame 52, the bracket 62 is positioned outside the shutter unit 24, the surface 62A of the bracket 62 and the surface 90A of the bracket 90 face each other in parallel to each other, and the orientation and position of the notch 62B of the bracket 62 coincide with the orientation and position of the notch 90B of the bracket 90.

The shutter unit 24 includes through-holes 92, 94, 96, and 98. Each of the through-holes 92, 94, 96, and 98 is formed in a rectangular shape with opposite sides parallel to the X direction and opposite sides parallel to the Y direction. The through-hole 92 is disposed at an upper left portion of the shutter unit 24 in a case where the shutter unit 24 is viewed from the back side of the digital camera 10. Since the diameter of the through-hole 92 is larger than the diameter of the female screw 72, the female screw 72 is exposed from the through-hole 92 in a case where the shutter unit 24 is fitted to the front frame 52.

The through-hole 94 is disposed at a lower left portion of the shutter unit 24 in a case where the shutter unit 24 is viewed from the back side of the digital camera 10. Since the diameter of the through-hole 94 is larger than the diameter of the female screw 74, the female screw 74 is exposed from the through-hole 94 in a case where the shutter unit 24 is fitted to the front frame 52.

The through-hole 96 is disposed at a lower right portion of the shutter unit 24 in a case where the shutter unit 24 is viewed from the back side of the digital camera 10. Since the diameter of the through-hole 96 is larger than the diameter of the female screw 76, the female screw 76 is exposed from the through-hole 96 in a case where the shutter unit 24 is fitted to the front frame 52.

The through-hole 98 is disposed at an upper right portion of the shutter unit 24 in a case where the shutter unit 24 is viewed from the back side of the digital camera 10. Since the diameter of the through-hole 98 is larger than the diameter of the female screw 78, the female screw 78 is exposed from the through-hole 98 in a case where the shutter unit 24 is fitted to the front frame 52.

The shutter unit 24 is mounted on the front frame 52 using male screws 100, 102, 104, and 106 to be capable of oscillating along the XY plane.

The male screw 100 includes a head portion 100A and a shaft portion 100B. The head portion 100A is formed in the shape of a disk and is larger than the through-hole 92. That is, the size of the head portion 100A is set to a size that allows the head portion 100A to be in contact with a peripheral edge portion of the through-hole 92 in the Z direction. The shaft portion 100B is formed in the shape of a column extending from the center of the head portion 100A in one direction. The thickness of the shaft portion 100B is set to a thickness that allows the shaft portion 100B to oscillate in the through-hole 92 in a case where the shaft portion 100B is inserted into the through-hole 92, that is, a thickness that allows gaps to be formed between the shaft portion 100B and a peripheral surface of the through-hole 92 in the X direction and the Y direction. A screw thread corresponding to the screw thread of the female screw 72 is formed at a distal end portion of the shaft portion 100B.

The male screw 102 includes a head portion 102A and a shaft portion 102B. The head portion 102A is formed in the shape of a disk and is larger than the through-hole 94. That is, the size of the head portion 102A is set to a size that allows the head portion 102A to be in contact with a peripheral edge portion of the through-hole 94 in the Z direction. The shaft portion 102B is formed in the shape of a column extending from the center of the head portion 102A in one direction. The thickness of the shaft portion 102B is set to a thickness that allows the shaft portion 102B to oscillate in the through-hole 94 in a case where the shaft portion 102B is inserted into the through-hole 94, that is, a thickness that allows gaps to be formed between the shaft portion 102B and a peripheral surface of the through-hole 94 in the X direction and the Y direction. A screw thread corresponding to the screw thread of the female screw 74 is formed at a distal end portion of the shaft portion 102B.

The male screw 104 includes a head portion 104A and a shaft portion 104B. The head portion 104A is formed in the shape of a disk and is larger than the through-hole 96. That is, the size of the head portion 104A is set to a size that allows the head portion 104A to be in contact with a peripheral edge portion of the through-hole 96 in the Z direction. The shaft portion 104B is formed in the shape of a column extending from the center of the head portion 104A in one direction. The thickness of the shaft portion 104B is set to a thickness that allows the shaft portion 104B to oscillate in the through-hole 96 in a case where the shaft portion 104B is inserted into the through-hole 96, that is, a thickness that allows gaps to be formed between the shaft portion 104B and a peripheral surface of the through-hole 96 in the X direction and the Y direction. A screw thread corresponding to the screw thread of the female screw 76 is formed at a distal end portion of the shaft portion 104B.

The male screw 106 includes a head portion 106A and a shaft portion 106B. The head portion 106A is formed in the shape of a disk and is larger than the through-hole 98. That is, the size of the head portion 106A is set to a size that allows the head portion 106A to be in contact with a peripheral edge portion of the through-hole 98 in the Z direction. The shaft portion 106B is formed in the shape of a column extending from the center of the head portion 106A in one direction. The thickness of the shaft portion 106B is set to a thickness that allows the shaft portion 106B to oscillate in the through-hole 98 in a case where the shaft portion 106B is inserted into the through-hole 98, that is, a thickness that allows gaps to be formed between the shaft portion 106B and a peripheral surface of the through-hole 98 in the X direction and the Y direction. A screw thread corresponding to the screw thread of the female screw 78 is formed at a distal end portion of the shaft portion 106B.

In a state where the positions of the female screws 72, 74, 76, and 78 are aligned with the positions of the through-holes 92, 94, 96, and 98, the shaft portion 100B of the male screw 100 is inserted into the through-hole 92 of the shutter unit 24 fitted to the front frame 52, the shaft portion 102B of the male screw 102 is inserted into the through-hole 94, the shaft portion 104B of the male screw 104 is inserted into the through-hole 96, and the shaft portion 106B of the male screw 106 is inserted into the through-hole 98. Then, the distal end portion of the shaft portion 100B of the male screw 100 is screwed into the female screw 72. Further, the distal end portion of the shaft portion 102B of the male screw 102 is screwed into the female screw 74. Furthermore, the distal end portion of the shaft portion 104B of the male screw 104 is screwed into the female screw 76. Moreover, the distal end portion of the shaft portion 106B of the male screw 106 is screwed into the female screw 78.

The digital camera 10 comprises spring units 108A, 108B, and 108C. The spring units 108A, 108B, and 108C have the same configuration. In a case where the spring units 108A, 108B, and 108C do not need to be described while being distinguished from each other in the following description, the spring units 108A, 108B, and 108C are referred to as "spring units 108".

The spring unit 108 includes a compression coil spring 110, a first engaging member 112, and a second engaging member 114. The compression coil spring 110 is an example of an "elastic member" and "compression coil spring" according to the technique of the present disclosure. The first engaging member 112 is fixed to one end of the compression coil spring 110, and the second engaging member 114 is fixed to the other end of the compression coil spring 110. Here, one end of the compression coil spring 110 is an example of a "first end portion" according to the technique of the present disclosure, and the other end of the compression coil spring 110 is an example of a "second end portion" according to the technique of the present disclosure.

The first engaging member 112 and the second engaging member 114 have the same shape and size. A curved dent 114A is formed on a side peripheral surface of the second engaging member 114. A dent (not shown) having the same shape and size as the dent 114A is also formed on a side peripheral surface of the first engaging member 112.

The spring unit 108A is used for the bracket 58 of the front frame 52 and the bracket 86 of the shutter unit 24. That is, the dent of the first engaging member 112 is inserted into the notch 58B of the bracket 58, so that the first engaging member 112 of the spring unit 108A is engaged with the bracket 58. Further, the dent 114A of the second engaging member 114 is inserted into the notch 86B of the bracket 86, so that the second engaging member 114 of the spring unit 108A is engaged with the bracket 86. Since the spring unit 108A is used for the bracket 58 of the front frame 52 and the bracket 86 of the shutter unit 24 as described above, the positions of the end portions of the compression coil spring 110A of the spring unit 108A are held.

The spring unit 108B is used for the bracket 60 of the front frame 52 and the bracket 88 of the shutter unit 24. That is, the dent of the first engaging member 112 is inserted into the notch 60B of the bracket 60, so that the first engaging member 112 of the spring unit 108B is engaged with the bracket 60. Further, the dent 114A of the second engaging member 114 is inserted into the notch 88B of the bracket 88, so that the second engaging member 114 of the spring unit 108B is engaged with the bracket 88. Since the spring unit 108B is used for the bracket 60 of the front frame 52 and the bracket 88 of the shutter unit 24 as described above, the positions of the end portions of the compression coil spring 110B of the spring unit 108B are held.

The spring unit 108C is used for the bracket 62 of the front frame 52 and the bracket 90 of the shutter unit 24. That is, the dent of the first engaging member 112 is inserted into the notch 62B of the bracket 62, so that the first engaging member 112 of the spring unit 108C is engaged with the bracket 62. Further, the dent 114A of the second engaging member 114 is inserted into the notch 90B of the bracket 90, so that the second engaging member 114 of the spring unit 108C is engaged with the bracket 90. Since the spring unit 108C is used for the bracket 62 of the front frame 52 and the bracket 90 of the shutter unit 24 as described above, the positions of the end portions of the compression coil spring 110C of the spring unit 108C are held.

The first engaging members 112, the second engaging members 114, the bracket 58, the bracket 60, the bracket 62, the bracket 86, the bracket 88, and the bracket 90 are an example of a "holding mechanism" according to the technique of the present disclosure. The first engaging member 112 is an example of a "first engaging member" according to the technique of the present disclosure. Each of the brackets 58, 60, and 62 is an example of a "first fastener" according to the technique of the present disclosure. The second engaging member 114 is an example of a "second engaging member" according to the technique of the present disclosure. Each of the brackets 86, 88, and 90 is an example of a "second fastener" according to the technique of the present disclosure.

Further, an aspect in which the first engaging members 112 are applied to the spring units 108A, 108B, and 108C and the brackets 58, 60, and 62 are applied to the front frame 52 has been described in the present embodiment, but the technique of the present disclosure is not limited thereto. For example, members corresponding to the first engaging members 112 may be applied to the front frame 52 instead of the brackets 58, 60, and 62, and members corresponding to the brackets 58, 60, and 62 may be applied to the spring units 108A, 108B, and 108C instead of the first engaging members 112.

Furthermore, an aspect in which the second engaging members 114 are applied to the spring units 108A, 108B, and 108C and the brackets 86, 88, and 90 are applied to the shutter unit 24 has been described in the present embodiment, but the technique of the present disclosure is not limited thereto. For example, members corresponding to the second engaging members 114 may be applied to the shutter unit 24 instead of the brackets 86, 88, and 90, and members corresponding to the brackets 86, 88, and 90 may be applied to the spring units 108A, 108B, and 108C instead of the second engaging members 114.

For example, as shown in FIG. 4, the power transmission mechanism 84 comprises a link member 116, a connecting pin 118, and a connecting pin 120. Further, the power transmission mechanism 84 comprises a link member 122, a connecting pin 124, and a connecting pin 126. The link members 116 and 122 are an example of a "rotating member" according to the technique of the present disclosure.

One end portion of the link member 116 in a longitudinal direction is connected to one end portion of the front curtain 44 in the X direction by the connecting pin 118 of which an axial direction is parallel to the Z direction. The other end portion of the link member 116 in the longitudinal direction is connected to a mounting part 128 by the connecting pin 120 of which an axial direction is parallel to the Z direction.

One end portion of the link member 122 in a longitudinal direction is connected to one end portion of the rear curtain 46 in the X direction by the connecting pin 124 of which an axial direction is parallel to the Z direction. The other end portion of the link member 122 in the longitudinal direction is connected to the mounting part 128 by the connecting pin 126 of which an axial direction is parallel to the Z direction.

The rear curtain 46 is disposed above the front curtain 44 in the Y direction. The drive source 82 generates power under the control of the control device 36 (see FIG. 2), and applies the generated power to the link members 116 and 122. The link members 116 and 122 are rotated by the power applied from the drive source 82 to open and close the front curtain 44 and the rear curtain 46.

For example, as shown in FIG. 5, the shaft portion 102B of the male screw 102 is inserted into the through-hole 94 in the Z direction and the distal end portion of the shaft portion 102B is screwed into the female screw 74 of the front frame 52. The male screw 102 regulates the excessive misregistration of the shutter unit 24 from the front frame 52 in the Z direction. On the other hand, the male screw 102 gives a degree of freedom that allows the shutter unit 24 to be movable with respect to the front frame 52 in the X direction and the Y direction at a portion where the through-hole 94 is formed. In addition, the male screw 102 regulates the excessive movement of the shutter unit 24 by coming into contact with the peripheral edge portion of the through-hole 94 in a case where the shutter unit 24 is moved more than necessary in the X direction and the Y direction.

The shaft portion 104B of the male screw 104 is inserted into the through-hole 96 in the Z direction and the distal end portion of the shaft portion 104B is screwed into the female screw 76 of the front frame 52. The male screw 104 regulates the excessive misregistration of the shutter unit 24 from the front frame 52 in the Z direction. On the other hand, the male screw 104 gives a degree of freedom that allows the shutter unit 24 to be movable with respect to the front frame 52 in the X direction and the Y direction at a portion where the through-hole 96 is formed. In addition, the male screw 104 regulates the excessive movement of the shutter unit 24 by coming into contact with the peripheral edge portion of the through-hole 96 in a case where the shutter unit 24 is moved more than necessary in the X direction and the Y direction.

The shaft portion 100B of the male screw 100 is inserted into the through-hole 92 in the Z direction and the distal end portion of the shaft portion 100B is screwed into the female screw 72 of the front frame 52. The male screw 100 regulates the excessive misregistration of the shutter unit 24 from the front frame 52 in the Z direction. On the other hand, the male screw 100 gives a degree of freedom that allows the shutter unit 24 to be movable with respect to the front frame 52 in the X direction and the Y direction at a portion where the through-hole 92 is formed. In addition, the male screw 100 regulates the excessive movement of the shutter unit 24 by coming into contact with the peripheral edge portion of the through-hole 92 in a case where the shutter unit 24 is moved more than necessary in the X direction and the Y direction.

The shaft portion 106B of the male screw 106 is inserted into the through-hole 98 in the Z direction and the distal end portion of the shaft portion 106B is screwed into the female screw 78 of the front frame 52. The male screw 106 regulates the excessive misregistration of the shutter unit 24 from the front frame 52 in the Z direction. On the other hand, the male screw 106 gives a degree of freedom that allows the shutter unit 24 to be movable with respect to the front frame 52 in the X direction and the Y direction at a portion where the through-hole 98 is formed. In addition, the male screw 106 regulates the excessive movement of the shutter unit 24 by coming into contact with the peripheral edge portion of the through-hole 98 in a case where the shutter unit 24 is moved more than necessary in the X direction and the Y direction.

In a case where the shutter unit 24 is mounted on the front frame 52 as described above using the male screws 100, 102, 104, and 106 and the female screws 72, 74, 76, and 78, the friction materials 64, 66, 68, and 70 interposed between the flat surface 54 and the front surface 41 are pressed against the flat surface 54 by the front surface 41. In a case where the shutter unit 24 is moved in the XY plane in a state where the friction materials 64, 66, 68, and 70 are in pressure contact with the front surface 41, misregistration between the front frame 52 and the shutter unit 24 is suppressed by a friction force generated between the front surface 41 and the friction materials 64, 66, 68, and 70.

Figure 6:
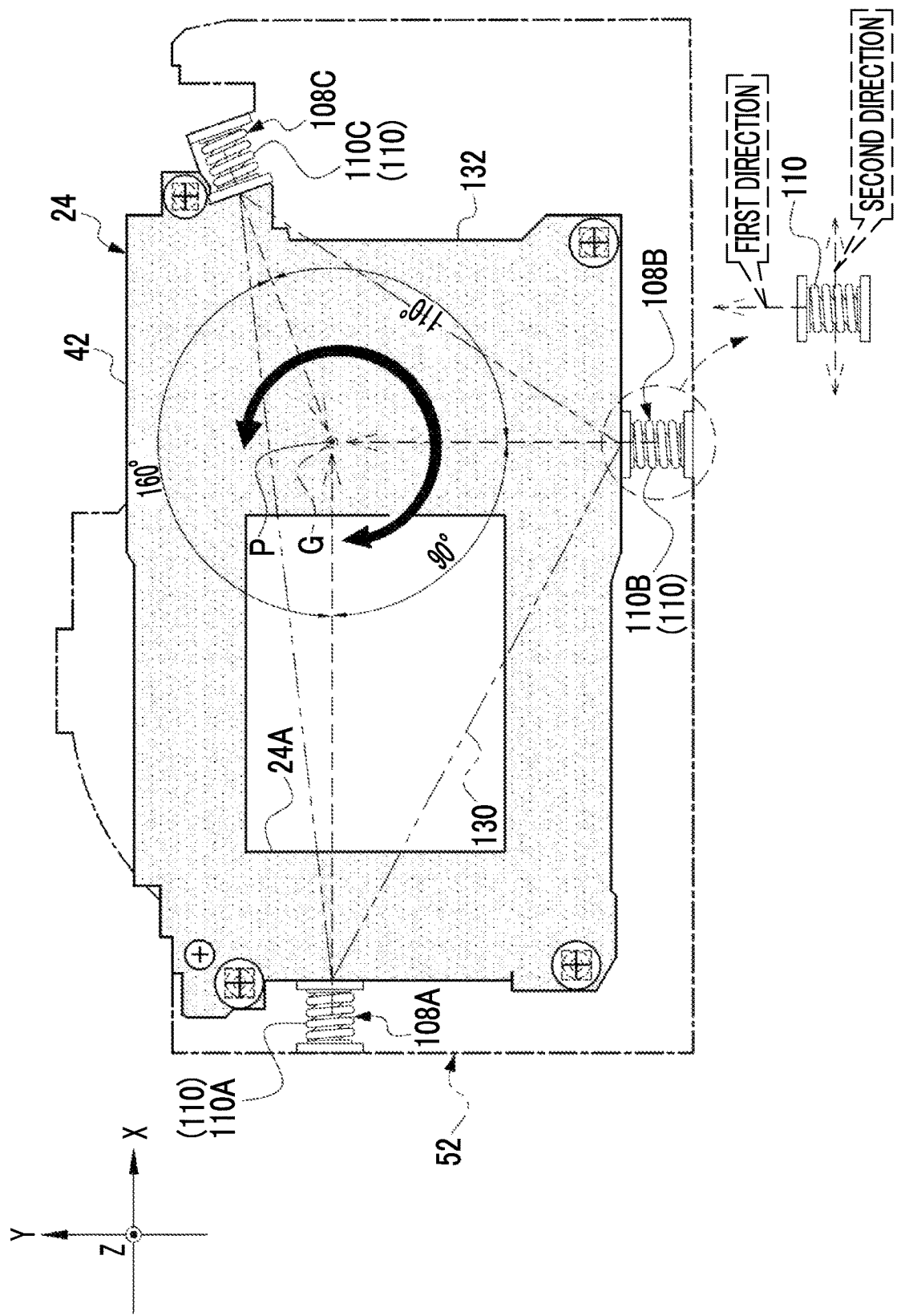
FIG. 6 is a schematic back view showing an example of the configuration of the front frame and the shutter unit in a case where an aspect in which the shutter unit is mounted on the front frame is viewed from the back side of the digital camera.
Figure 7:
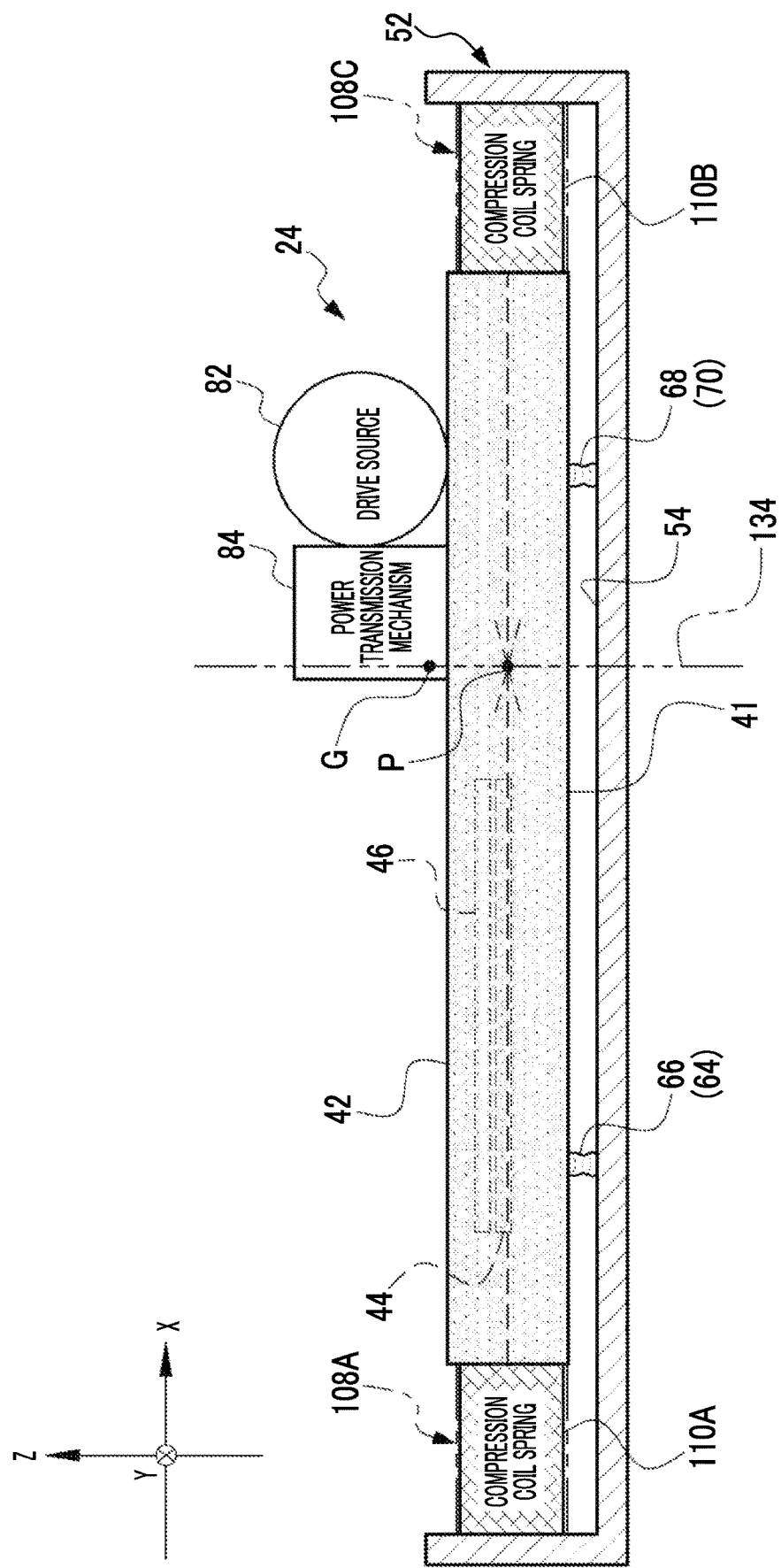
FIG. 7 is a schematic bottom view showing an example of the configuration of the front frame and the shutter unit in a case where an aspect in which the shutter unit is pressed by a plurality of compression coil springs from the outer periphery of the shutter unit toward an intersection on an imaginary line passing through a centroid in a Z direction in a state where the shutter unit is mounted on the front frame is viewed from the bottom side of the digital camera.

For example, as shown in FIG. 6, the shutter unit 24 has a centroid G (see also FIG. 7). The centroid G is a point of application of a resultant force of gravitational forces that act on the respective portions of the shutter unit 24. The centroid G is obtained as, for example, an intersection between the line of action of the tension of a thread in a case where one point of the shutter unit 24 is suspended with the thread and is stopped and the line of action of the tension of a thread in a case where another point of the shutter unit 24 is suspended with the thread and is stopped.

The spring units 108A, 108B, and 108C are inserted between the shutter unit 24 and the front frame 52 on the side surfaces of the shutter unit 24. Accordingly, the elastic force of each of the compression coil spring 110 (hereinafter, also referred to as "compression coil spring 110A") of the spring unit 108A, the compression coil spring 110 (hereinafter, also referred to as "compression coil spring 110B") of the spring unit 108B, and the compression coil spring 110 (hereinafter, also referred to as "compression coil spring 110C") of the spring unit 108B acts on the side surface of the shutter unit 24 from the front frame 52.

The compression coil springs 110A, 110B, and 110C are disposed at spots that form a triangle 130 of which vertices correspond to the respective positions of the compression coil springs 110A, 110B, and 110C. An interval between adjacent vertices of the triangle 130 is an interval less than 180° in a circumferential direction around a specific spot (an intersection P (described later) in an example shown in FIG. 6) to be described later in a case where the shutter unit 24 is viewed in the Z direction. In the example shown in FIG. 6, in the triangle 130, an interval between the vertex corresponding to the position of the compression coil spring 110A and the vertex corresponding to the position of the compression coil spring 110B is 90°, an interval between the vertex corresponding to the position of the compression coil spring 110B and the vertex corresponding to the position of the compression coil spring 110C is 110°, and an interval between the vertex corresponding to the position of the compression coil spring 110C and the vertex corresponding to the position of the compression coil spring 110A is 160°.

The compression coil springs 110A, 110B, and 110C are disposed on the outer periphery of a contour 132 of the shutter unit 24 in a case where the shutter unit 24 is viewed in the Z direction, and press the shutter unit 24 from the front frame 52 to support the shutter unit 24. That is, the shutter unit 24 is supported from the outer peripheral side of the shutter unit 24 by the compression coil springs 110A, 110B, and 110C in a state where the shutter unit 24 can oscillate against the elastic forces of the compression coil springs 110A, 110B, and 110C.

Each of the compression coil springs 110A, 110B, and 110C is elastically deformed in a first direction that is a direction in which each of the compression coil springs 110A, 110B, and 110C presses the shutter unit 24 from the front frame 52 and a second direction that is a direction perpendicular to the first direction. For each of the compression coil springs 110A, 110B, and 110C, the elastic force in the first direction is larger than the elastic force in the second direction. Further, the first direction of the compression coil spring 110B coincides with a vertical direction, that is, the Y direction in a case where the digital camera 10 picks up an image in the standard posture. Furthermore, the first directions of the respective compression coil springs 110A, 110B, and 110C intersect with each other at the specific spot inside the contour 132. The specific spot is positioned inside the triangle 130.

Here, the specific spot refers to, for example, one spot inside the contour 132. One spot inside the contour 132 refers to a spot that coincides with the centroid G in a case where the shutter unit 24 is viewed in the Z direction. In the example shown in FIGS. 6 and 7, an intersection P between the XY plane in the shutter frame 42 in a case where the shutter unit 24 is viewed in the Z direction and an imaginary line 134, which passes through the centroid G in the Z direction, is shown as an example of one spot inside the contour 132.

In the example shown in FIG. 6, the shutter unit 24 is in a reference position. The reference position refers to the position of the shutter unit 24 in a state where the digital camera 10 is in the standard posture and vibration is not applied to the digital camera 10. The compression coil springs 110A, 110B, and 110C are disposed on the side surface of the shutter unit 24, that is, between the front frame 52 and the shutter unit 24 on the outer periphery of the contour 132 in a state where the compression coil springs 110A, 110B, and 110C are compressed in the first direction in a case where the shutter unit 24 is in the reference position. The amount of elastic deformation of the compression coil springs 110A, 110B, and 110C in a case where the position of the shutter unit 24 is the reference position is equal to or larger than the movable distance of the shutter unit 24. Examples of the amount of elastic deformation of the compression coil springs 110A, 110B, and 110C in this case is one to two times the movable distance of the shutter unit 24.

Here, the movable distance of the shutter unit 24 corresponds to, for example, the movable distances of the shaft portions 100B, 102B, 104B, and the 106B relative to the shutter unit 24 in the through-holes 92, 94, 96, and 98 (see FIGS. 3 and 5).

Further, the moving distance of the shutter unit 24 in the vertical direction, that is, the Y direction in a case where the digital camera 10 picks up an image in the standard posture is set to be equal to or less than the movable distance of the shutter unit 24. That is, the elastic force of at least the compression coil spring 110B among the compression coil springs 110A, 110B, and 110C is set such that the moving distance of the shutter unit 24 in the Y direction is equal to or less than the movable distance of the shutter unit 24. Examples of the moving distance of the shutter unit 24 in the Y direction, which is mentioned here, include one-third or less of the movable distance of the shutter unit 24.

Incidentally, in a case where the link members 116 and 122 (see FIG. 4) are rotated to open or close the front curtain 44 and the rear curtain 46, rotational forces caused by the rotation of the link members 116 and 122 are applied to the shutter unit 24. Accordingly, for example, the shutter unit 24 oscillates in the direction of an arc arrow shown in FIGS. 6 and 8 (for example, a direction in which the shutter unit 24 is rotated in the XY plane around the intersection P). That is, the shutter unit 24 is rotated about the centroid G in the direction of the arc arrow (see FIGS. 6 and 8) by forces of inertia that are caused by the rotation of the link members 116 and 122 and/or impact forces that are caused by the collision of the front curtain 44 and the rear curtain 46 with the shutter frame 42 in a case where the front curtain 44 and the rear curtain 46 are opened or closed by the rotation of the link members 116 and 122. Specifically, the shutter unit 24 oscillates in a direction tangential to the direction of the arc arrow (see FIGS. 6 and 8), that is, the second direction.

Figure 8:
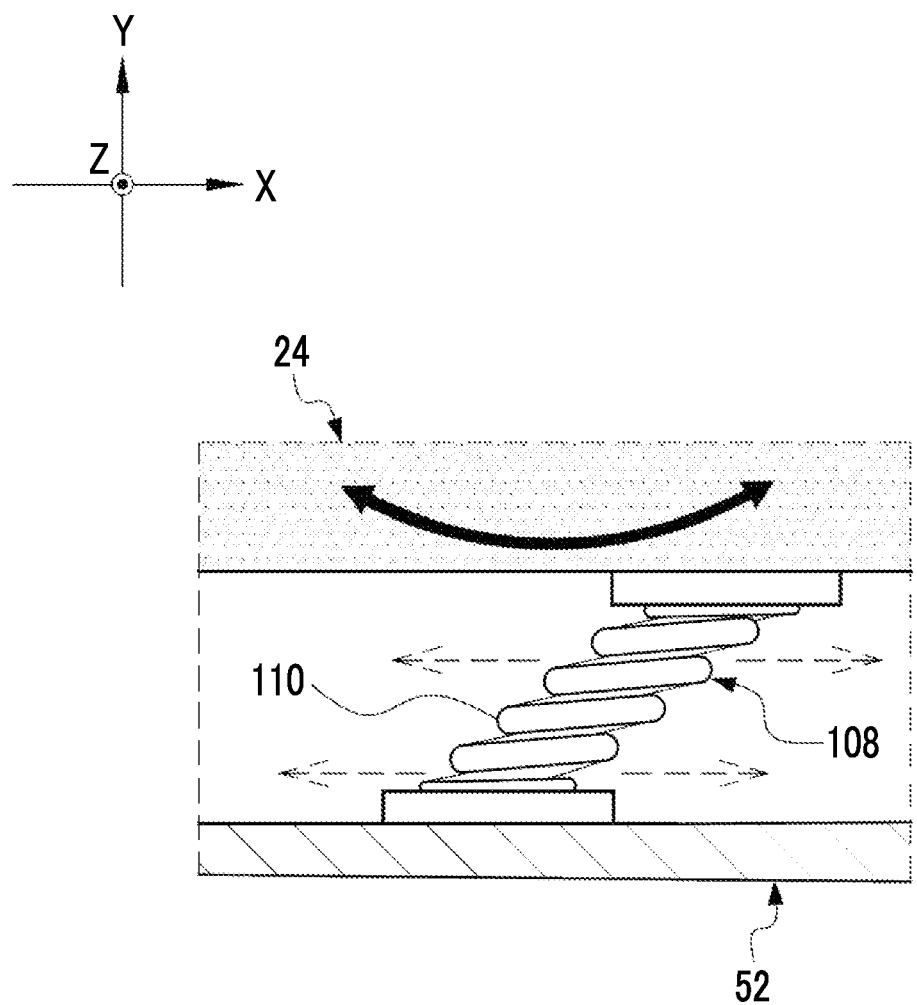
FIG. 8 is a conceptual diagram showing an example of an aspect in which the compression coil spring is elastically deformed in a second direction as the shutter unit is shaken in the second direction.

In a case where the shutter unit 24 oscillates in the second direction as described above, for example, the compression coil springs 110 are elastically deformed in a direction in which shear stress is applied, that is, the second direction as shown in FIG. 8. The elastic force of the compression coil spring 110 is set to an elastic force that allows an oscillation amplitude by which the shutter unit 24 oscillates in the second direction to be less than the maximum oscillation amplitude of the shutter unit 24 in the second direction. For example, the elastic force of the compression coil spring 110 is determined such that the oscillation amplitude of the shutter unit 24 in the second direction is about a half of the maximum oscillation amplitude of the shutter unit 24 in the second direction.

Next, the action obtained from the above-mentioned configuration will be described.

For example, as shown in FIG. 6, the shutter unit 24 is pressed from the front frame 52 toward the intersection P by each of the compression coil springs 110A, 110B, and 110C disposed on the outer periphery of the contour 132. The compression coil springs 110A, 110B, and 110C press the shutter unit 24 from the front frame 52 toward the intersection P to support the shutter unit 24. Further, in a case where the digital camera 10 picks up an image in the standard posture (see FIG. 1), for example, the first direction of the compression coil spring 110B coincides with the vertical direction, that is, Y direction as shown in FIG. 6. For this reason, it is possible to easily hold the shutter unit 24 at the reference position in a case where the digital camera 10 picks up an image in the standard posture, as compared to a case where the vertical direction does not coincide with the first direction of none of the compression coil springs 110A, 110B, and 110C.

In a case where power generated by the drive source 82 is applied to the link members 116 and 122 (see FIG. 4) in a state where the shutter unit 24 is supported by each of the compression coil springs 110A, 110B, and 110C as described above, the link members 116 and 122 are rotated. Rotational forces caused by the rotation of the link members 116 and 122 are transmitted to the front curtain 44 and the rear curtain 46. As a result, the front curtain 44 and the rear curtain 46 are opened and closed.

In this case, the shutter unit 24 oscillates in the second direction due to the forces of inertia that are caused by the rotation of the link members 116 and 122 and/or the impact forces that are caused by the collision of the front curtain 44 and the rear curtain 46 with the shutter frame 42.

In this case, the elastic forces of the respective compression coil springs 110A, 110B, and 110C in the second direction act on the shutter unit 24 against the oscillation of the shutter unit 24 in the second direction. That is, the compression coil springs 110A, 110B, and 110C act on the shutter unit 24 in a direction in which the shutter unit 24 returns to the reference position. Further, even in a state where the shutter unit 24 oscillates in the second direction, the compression coil springs 110A, 110B, and 110C disposed on the outer periphery of the contour 132 press the shutter unit 24 from the front frame 52 to continue to support the shutter unit 24. Therefore, according to this configuration, it is possible to achieve both the suppression of vibration caused by the opening/closing operations of the front curtain 44 and the rear curtain 46 and the holding of the position of the shutter unit 24 with high accuracy as compared to a case where the shutter unit 24 is supported from the front frame 52 by two or less elastic members.

Furthermore, in the digital camera 10, the shutter unit 24 is supported from the front frame 52 by the compression coil springs 110A, 110B, and 110C in a state where the shutter unit 24 can oscillate against the elastic forces of the compression coil springs 110A, 110B, and 110C. That is, in a case where the shutter unit 24 is directly supported by the front frame 52, vibration caused by the opening/closing operations of the front curtain 44 and the rear curtain 46 is transmitted to the shutter unit 24. However, since the shutter unit 24 is supported from the front frame 52 by the compression coil springs 110A, 110B, and 110C, vibration caused by the opening/closing operations of the front curtain 44 and the rear curtain 46 is absorbed by the compression coil springs 110A, 110B, and 110C. Therefore, according to this configuration, it possible to cause vibration, which is caused by the opening/closing operations of the front curtain 44 and the rear curtain 46, to be less likely to be transmitted to the front frame 52 as compared to a case where the shutter unit 24 is directly supported by the front frame 52.

Incidentally, for example, as shown in FIG. 2, the imaging lens 18 is mounted on the front frame 52 via the lens mount 14. That is, the optical shake correction mechanism 32 (see FIG. 2) is mounted on the front frame 52. Further, the camera body-side shake correction mechanism 40 (see FIG. 2) is held by the holding frame 28. That is, the camera body-side shake correction mechanism 40 is mounted on the holding frame 28.

Accordingly, vibration caused by the opening/closing operations of the front curtain 44 and the rear curtain 46 is transmitted to the optical shake correction mechanism 32 and the camera body-side shake correction mechanism 40 via the holding frame 28. In a case where vibration caused by the opening/closing operations of the front curtain 44 and the rear curtain 46 is transmitted to the optical shake correction mechanism 32 and the camera body-side shake correction mechanism 40, the quality of a captured image, which is obtained in a case where the digital camera 10 picks up an image, is caused to deteriorate.

However, the compression coil springs 110A, 110B, and 110C are elastically deformed, so that vibration caused by the opening/closing operations of the front curtain 44 and the rear curtain 46 is absorbed. In particular, the compression coil springs 110A, 110B, and 110C are elastically deformed in the second direction, so that vibration generated in the second direction due to the opening/closing operations of the front curtain 44 and the rear curtain 46 is absorbed.

Therefore, according to this configuration, it is possible to suppress the deterioration of the quality of a captured image that is caused in a case where vibration caused by the opening/closing operations of the front curtain 44 and the rear curtain 46 is transmitted to the optical shake correction mechanism 32 and the camera body-side shake correction mechanism 40.

Further, in the digital camera 10, the compression coil springs 110A, 110B, and 110C press the shutter unit 24 from the outer peripheral side of the contour 132 toward one spot inside the contour 132 (see FIG. 6) of the shutter unit 24. Accordingly, pressing forces applied to the shutter unit 24 by the respective compression coil springs 110A, 110B, and 110C, that is, pressing forces applied in the first direction concentrate on one spot inside the contour 132. Therefore, according to this configuration, it is possible to easily hold the position of the shutter unit 24 at the reference position and to cause vibration, which is caused by the opening/closing operations of the front curtain 44 and the rear curtain 46, to be easily absorbed by the compression coil springs 110A, 110B, and 110C, as compared to a case where the compression coil springs 110A, 110B, and 110C press the shutter unit 24 toward different spots that are present inside the contour 132 and different from each other.

Here, one spot inside the contour 132 refers to the intersection P (see FIG. 6). The intersection P is positioned on the imaginary line 134 (see FIG. 7) that passes through the centroid G in the Z direction. Accordingly, pressing forces applied to the shutter unit 24 by the respective compression coil springs 110A, 110B, and 110C, that is, pressing forces applied in the first direction concentrate on the intersection P inside the contour 132. Therefore, according to this configuration, it is possible to easily hold the position of the shutter unit 24 at the reference position and to cause vibration, which is caused by the opening/closing operations of the front curtain 44 and the rear curtain 46, to be easily absorbed by the compression coil springs 110A, 110B, and 110C, as compared to a case where the compression coil springs 110A, 110B, and 110C press the shutter unit 24 toward a point not positioned on the imaginary line 134.

Further, the compression coil springs 110A, 110B, and 110C press the shutter unit 24 from the front frame 52 toward the intersection P in a state where the intersection P is positioned inside the triangle 130. Therefore, according to this configuration, it is possible to easily hold the shutter unit 24 at the reference position and to easily absorb vibration caused by the opening/closing operations of the front curtain 44 and the rear curtain 46, as compared to a case where pressing forces are applied toward a spot outside the triangle 130 by the respective compression coil springs 110A, 110B, and 110C to support the shutter unit 24.

Furthermore, in the triangle 130, all of an interval between the vertex corresponding to the position of the compression coil spring 110A and the vertex corresponding to the position of the compression coil spring 110B, an interval between the vertex corresponding to the position of the compression coil spring 110B and the vertex corresponding to the position of the compression coil spring 110C, and an interval between the vertex corresponding to the position of the compression coil spring 110C and the vertex corresponding to the position of the compression coil spring 110A are set to be less than 180°. Therefore, according to this configuration, it is possible to easily hold the shutter unit 24 at the reference position and to easily absorb vibration caused by the opening/closing operations of the front curtain 44 and the rear curtain 46, as compared to a case where any of an interval between the vertex corresponding to the position of the compression coil spring 110A and the vertex corresponding to the position of the compression coil spring 110B, an interval between the vertex corresponding to the position of the compression coil spring 110B and the vertex corresponding to the position of the compression coil spring 110C, and an interval between the vertex corresponding to the position of the compression coil spring 110C and the vertex corresponding to the position of the compression coil spring 110A is set to an interval of 180° or more in the circumferential direction around the intersection P.

Moreover, the elastic force of each of the compression coil springs 110A, 110B, and 110C in the first direction is larger than the elastic force thereof in the second direction. In this case, the pressing forces that are applied by the compression coil springs 110A, 110B, and 110C to support the shutter unit 24 from the front frame 52, that is, the pressing forces in the first direction are large and the compression coil springs 110A, 110B, and 110C are likely to be elastically deformed in the second direction, as compared to a case where the elastic force in the first direction is equal to or smaller than the elastic force in the second direction. Therefore, according to this configuration, it is possible to suppress the misregistration of the shutter unit 24 from the reference position that is caused by the weight of the shutter unit 24 and to increase ability to absorb the oscillation of the shutter unit 24 in the second direction, as compared to a case where the elastic force of the compression coil spring 110 in the first direction is smaller than the elastic force thereof in the second direction in a situation where the first direction of the compression coil spring 110 coincides with the vertical direction, that is, the Y direction.

It is conceivable that a state where the shutter unit 24 is positioned at an end of a movable range (for example, a state where the shaft portion 100B is in contact with the outer peripheral edge of the through-hole 92) is made depending on the magnitude (amplitude) of vibration caused by the opening/closing operations of the front curtain 44 and the rear curtain 46 in a case where the front curtain 44 and the rear curtain 46 are opened and closed. However, the compression coil springs 110A, 110B, and 110C are disposed between the front frame 52 and the shutter unit 24 on the outer periphery of the contour 132 in a state where the compression coil springs 110A, 110B, and 110C are compressed in the first direction in a case where the position of the shutter unit 24 is the reference position, and the amount of elastic deformation of the compression coil springs 110A, 110B, and 110C in a case where the position of the shutter unit 24 is the reference position is set to be equal to or larger than the movable distance of the shutter unit 24. Accordingly, even in a case where the shutter unit 24 is positioned at an end of the movable range, the elastic forces of the compression coil springs 110A, 110B, and 110C can continue to act on the shutter unit 24.

It is conceivable that the shutter unit 24 reaches an end of the movable range since the shutter unit 24 is moved in the vertical direction, that is, the Y direction in a case where the digital camera 10 picks up an image in the standard posture. The fact that the shutter unit 24 reaches an end of the movable range means that, for example, the shaft portion 100B is in contact with the outer peripheral edge of the through-hole 92. In a case where the shaft portion 100B powerfully collides with the outer peripheral edge of the through-hole 92, vibration is generated. For this reason, the moving distance of the shutter unit 24 in the vertical direction, that is, the Y direction in a case where the digital camera 10 picks up an image in the standard posture is set to be equal to or less than the movable distance of the shutter unit 24. Therefore, according to this configuration, it is possible to suppress since the shutter unit 24 is moved beyond the movable range (for example, the generation of vibration caused by the powerful collision of the shaft portion 100B with the outer peripheral edge of the through-hole 92), as compared to a case where the moving distance of the shutter unit 24 in the vertical direction in a case where the digital camera 10 picks up an image in the standard posture exceeds the movable distance of the shutter unit 24.

Further, rotational forces caused by the rotation of the link members 116 and 122 are applied to the shutter unit 24, so that the shutter unit 24 oscillates in the second direction in the digital camera 10. Accordingly, the elastic forces of the compression coil springs 110A, 110B, and 110C are set to elastic forces that allow the oscillation amplitude of the shutter unit 24 in the second direction to be less than the maximum oscillation amplitude of the shutter unit 24 in the second direction. The oscillation amplitude of the shutter unit 24 in the second direction is suppressed to be less than the maximum oscillation amplitude by the elastic forces of the compression coil springs 110A, 110B, and 110C. Therefore, according to this configuration, it is possible to suppress the oscillation of the shutter unit 24 in the second direction as compared to a case where the oscillation amplitude of the shutter unit 24 in the second direction is not limited.

Furthermore, in the digital camera 10, the compression coil springs 110A, 110B, and 110C are disposed between the front frame 52 and the shutter unit 24 on the outer periphery of the shutter unit 24 in a case where the position of the shutter unit 24 is the reference position. Therefore, according to this configuration, it is possible to contribute to the improvement of QCD as compared to a case where an elastic member having a structure more complicated than that of the compression coil spring 110 or an elastic member having an elastic force smaller than that of the compression coil spring 110 is used.

Moreover, in the digital camera 10, the positions of the end portions of the compression coil springs 110A, 110B, and 110C are held by the first engaging members 112, the second engaging members 114, the bracket 58, the bracket 60, the bracket 62, the bracket 86, the bracket 88, and the bracket 90. Therefore, according to this configuration, it is possible to suppress the misregistration of the compression coil springs 110A, 110B, and 110C as compared to a case where the positions of the end portions of the compression coil springs 110A, 110B, and 110C are not held.

Further, the first engaging member 112 fixed to one end of the compression coil spring 110A is engaged with the bracket 58 in the digital camera 10. Furthermore, the first engaging member 112 fixed to one end of the compression coil spring 110B is engaged with the bracket 60. Moreover, the first engaging member 112 fixed to one end of the compression coil spring 110C is engaged with the bracket 62. Therefore, according to this configuration, it is possible to easily perform work for holding one end of each of the compression coil springs 110A, 110B, and 110C at an appropriate position on the front frame 52 as compared to a case where work for directly fixing one end of each of the compression coil springs 110A, 110B, and 110C to an appropriate position on the front frame 52 is performed. Here, the appropriate position on the front frame 52 refers to, for example, a position corresponding to the position of each of the brackets 58, 60, and 62.

Further, in the digital camera 10, the second engaging member 114 fixed to the other end of the compression coil spring 110A is engaged with the bracket 86. Furthermore, the second engaging member 114 fixed to the other end of the compression coil spring 110B is engaged with the bracket 88. Moreover, the second engaging member 114 fixed to the other end of the compression coil spring 110C is engaged with the bracket 90. Therefore, according to this configuration, it is possible to easily perform work for holding the other end of each of the compression coil springs 110A, 110B, and 110C at an appropriate position on the shutter unit 24 as compared to a case where work for directly fixing the other end of each of the compression coil springs 110A, 110B, and 110C to an appropriate position on the shutter unit 24 is performed. Here, the appropriate position on the shutter unit 24 refers to, for example, a position corresponding to the position of each of the brackets 86, 88, and 90.

Further, in the digital camera 10, the friction materials 64, 66, 68, and 70 are interposed between the front surface 41 of the shutter unit 24 and the flat surface 54 of the front frame 52, and the friction materials 64, 66, 68, and 70 erected on the front frame 52 are in pressure contact with the front surface 41 (see FIG. 5). Accordingly, in a case where the shutter unit 24 is moved in the X direction and the Y direction, a friction force is generated between the front surface 41 and the friction materials 64, 66, 68, and 70. The movement of the shutter unit 24 in the X direction and the Y direction is regulated by the friction force that is generated between the front surface 41 and the friction materials 64, 66, 68, and 70 in a case where the shutter unit 24 is moved in the X direction and the Y direction. Therefore, according to this configuration, it is possible to cause the oscillation of the shutter unit 24 in the second direction to be rapidly converge as compared to a case where a mere space is formed between the front surface 41 of the shutter unit 24 and the flat surface 54 of the front frame 52. Further, it is possible to suppress the tilt of the shutter unit 24 toward the front frame 52 as compared to a case where a mere space is formed between the front surface 41 of the shutter unit 24 and the flat surface 54 of the front frame 52.

An aspect in which the friction materials 64, 66, 68, and 70 are interposed between the front surface 41 of the shutter unit 24 and the flat surface 54 of the front frame 52 has been described here, but is merely an example. At least one friction material having the same function as the friction materials 64, 66, 68, and 70 may be interposed between an inner wall of the front frame 52 and an outer wall of the shutter unit 24.

Further, a shake suppression method applied to the digital camera 10 includes: disposing the compression coil springs 110A, 110B, and 110C on the outer periphery of the contour 132 of the shutter unit 24; causing the compression coil springs 110A, 110B, and 110C to press the shutter unit 24 from the front frame 52 to support the shutter unit 24; causing each of the compression coil springs 110A, 110B, and 110C to be elastically deformed in the first direction that is a direction in which each of the compression coil springs 110A, 110B, and 110C presses the shutter unit 24 from the front frame 52 and the second direction that is a direction perpendicular to the first direction; and causing the first directions of the respective compression coil springs 110A, 110B, and 110C to intersect with each other at a specific spot (for example, the intersection P) inside the contour 132 of the shutter unit 24. Therefore, according to this configuration, it is possible to achieve both the suppression of vibration caused by the opening/closing operations of the front curtain 44 and the rear curtain 46 and the holding of the position of the shutter unit 24 with high accuracy as compared to a case where the shutter unit 24 is supported from the front frame 52 by two or less elastic members.

Figure 9:
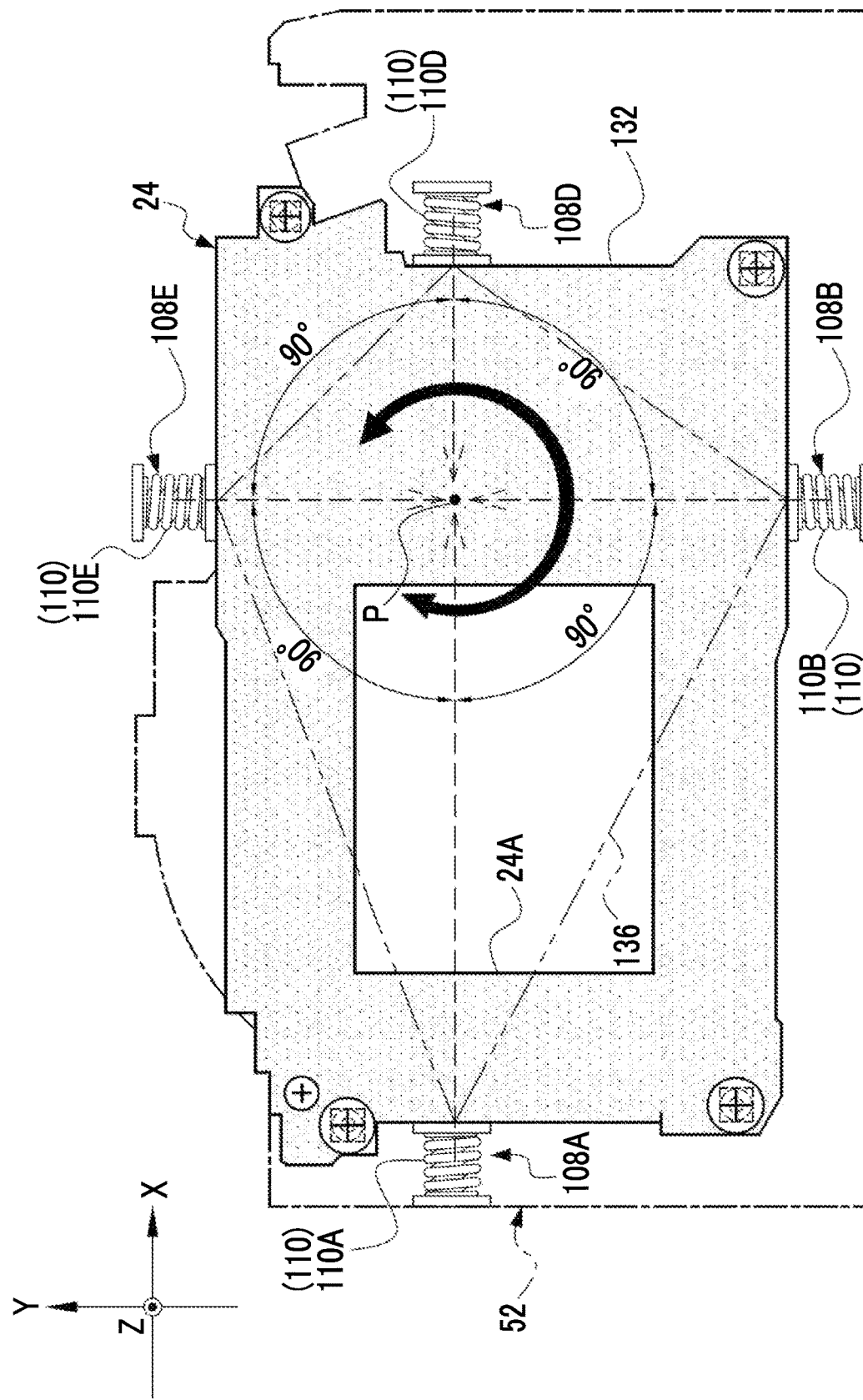
FIG. 9 is a schematic back view showing an example of the configuration of the front frame and the shutter unit in a case where an aspect in which the shutter unit is pressed by four compression coil springs from the outer periphery of the shutter unit toward an intersection on an imaginary line passing through a centroid in a Z direction in a state where the shutter unit is mounted on the front frame is viewed from the back side of the digital camera.

An aspect in which the compression coil spring 110 is disposed at each of the vertices of the triangle 130 has been described in the above-mentioned embodiment, but the technique of the present disclosure is not limited thereto. The compression coil springs may be disposed at vertices of a polygon (for example, a quadrangle, a pentagon, a hexagon, or the like) other than the triangle 130. In an example shown in FIG. 9, the compression coil spring 110 is disposed at each of the vertices of a quadrangle 136. The example shown in FIG. 9 is different from the example shown in FIG. 6 in that spring units 108D and 108E are applied instead of the spring unit 108C. The spring units 108D and 108E have the same configuration as the spring unit 108 described in the above-mentioned embodiment.

The spring unit 108D is disposed at a spot facing the spring unit 108A with the shutter unit 24 interposed therebetween on the outer periphery of the contour 132 of the shutter unit 24 in a case where the shutter unit 24 is viewed in the Z direction. The spring unit 108E is disposed at a spot facing the spring unit 108B with the shutter unit 24 interposed therebetween on the outer periphery of the contour 132 of the shutter unit 24 in a case where the shutter unit 24 is viewed in the Z direction.

The spring unit 108D includes a compression coil spring 110D and the spring unit 108E includes a compression coil spring 110E. The respective positions of the compression coil springs 110A, 110B, 110D, and 110E correspond to the positions of the respective vertices of the quadrangle 136. The intersection P is positioned inside the quadrangle 136. An interval between the adjacent vertices of the quadrangle 136 is an interval of 90° in a circumferential direction around the intersection P in a case where the shutter unit 24 is viewed in the Z direction. The compression coil springs 110D and 110E press the shutter unit 24 from the front frame 52 toward the intersection P to support the shutter unit 24. For example, even in a case where the compression coil springs 110A, 110B, 110D, and 110E are disposed as shown in FIG. 9, the same effect as the above-mentioned embodiment can be obtained.

Figure 10:
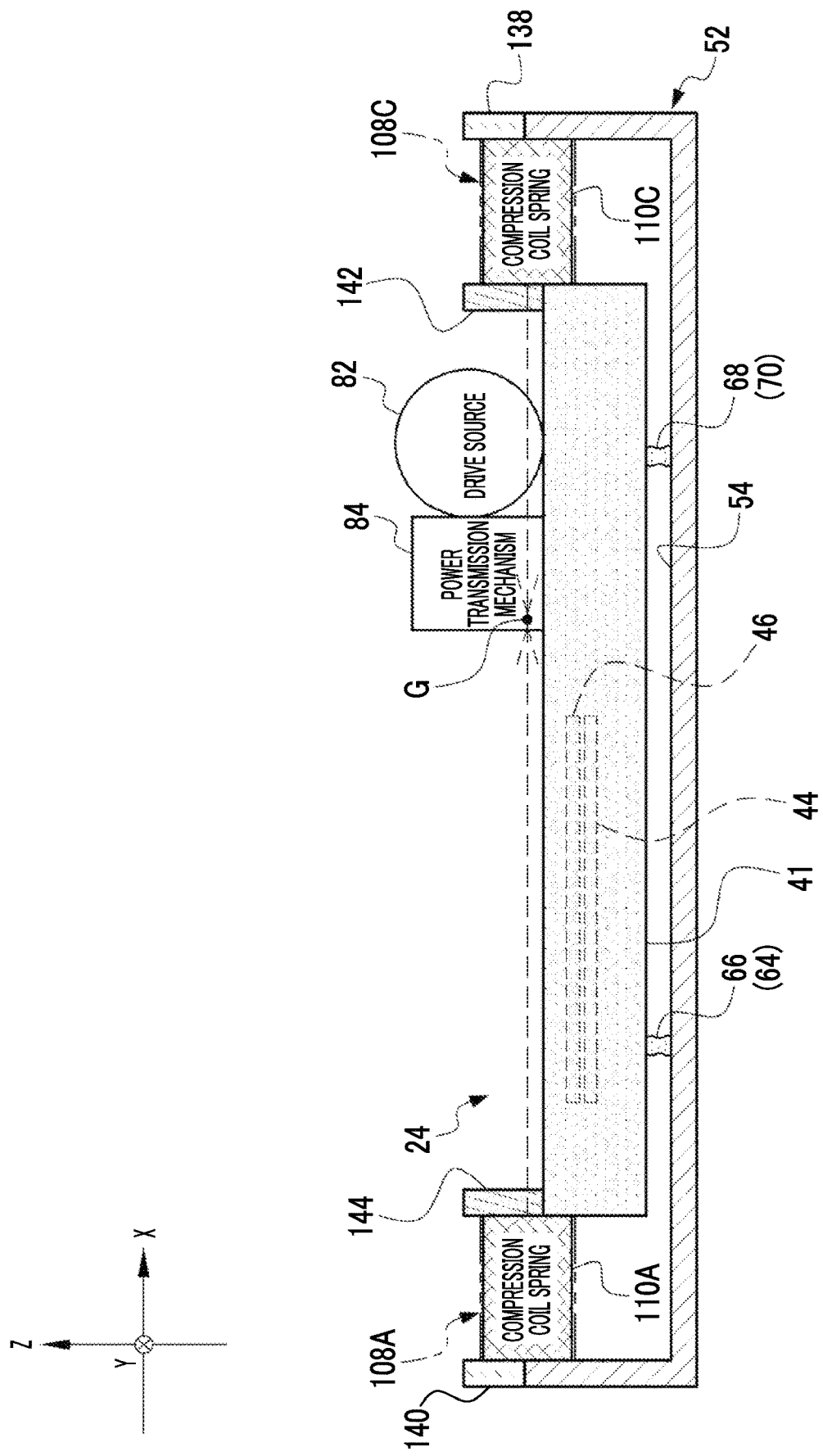
FIG. 10 is a schematic bottom view showing an example of the configuration of the front frame and the shutter unit in a case where an aspect in which the shutter unit is pressed by the plurality of compression coil springs from the outer periphery of the shutter unit toward a centroid in a state where the shutter unit is mounted on the front frame is viewed from the bottom side of the digital camera.

An aspect in which the elastic forces of the compression coil springs 110A, 110B, and 110C are applied toward the intersection P has been described in the above-mentioned embodiment, but the technique of the present disclosure is not limited thereto. For example, the elastic forces of the compression coil springs 110A, 110B, and 110C may be applied toward the centroid G. In this case, for example, as shown in FIG. 10, the positions of the compression coil springs 110A, 110B (not shown in an example shown in FIG. 10), and 110C in the Z direction coincide with each other and the compression coil springs 110A, 110B, and 110C are disposed at spots where one end portion of each of the compression coil springs 110A, 110B, and 110C faces the centroid G. That is, the compression coil springs 110A, 110B, and 110C are disposed such that the respective first directions of the compression coil springs 110A, 110B, and 110C intersect with each other at the centroid G.

In the example shown in FIG. 10, the front frame 52 includes extension frames 138 and 140. Further, the shutter unit 24 includes flat plate-like standing plate portions 142 and 144. The extension frame 138 is a frame that extends in the Z direction from a portion of the front frame 52 with which the spring unit 108C is in contact. The standing plate portion 142 is a flat plate-like portion that extends in the Z direction from a portion of the shutter unit 24 with which the spring unit 108C is in contact. The compression coil spring 110C is disposed to be compressed between the extension frame 138 and the standing plate portion 142 such that an elastic force is applied toward the centroid G.

The extension frame 140 is a frame that extends in the Z direction from a portion of the front frame 52 with which the spring unit 108A is in contact. The standing plate portion 144 is a flat plate-like portion that extends in the Z direction from a portion of the shutter unit 24 with which the spring unit 108A is in contact. The compression coil spring 110A is disposed to be compressed between the extension frame 140 and the standing plate portion 144 such that an elastic force is applied toward the centroid G. Although not shown, an extension frame and a standing plate portion having the same configuration as the extension frame 138 (140) and the standing plate portion 142 (144) are also used for the spring unit 108B for the same purpose.

Therefore, according to this configuration, it is possible to easily hold the position of the shutter unit 24 at the reference position and to easily absorb vibration caused by the opening/closing operations of the front curtain 44 and the rear curtain 46 (particularly, the oscillation of the shutter unit 24 in the second direction), as compared to a case where the respective first directions of the compression coil springs 110A, 110B, and 110C do not intersect with each other at the centroid G.

Further, one point called the intersection P has been exemplified in the above-mentioned embodiment, but the technique of the present disclosure is not limited thereto. For example, one point may be a specific spot that is not a point and has an area (hereinafter, also simply referred to as "a specific spot having an area"). As long as the specific spot having an area may be, for example, one spot inside the triangle 130, the specific spot having an area may be a three-dimensional region including the intersection P (for example, a region including the intersection P in an XYZ space) or a two-dimensional region (for example, a region including the intersection P in the XY plane) or may be, for example, a three-dimensional region including the centroid G (for example, a region including the centroid G in the XYZ space) or a two-dimensional region (for example, a region including the centroid G in the XY plane).

Further, the specific spot having an area is a predetermined range 146 inside the contour 132 of the shutter unit 24. The range 146 is one spot positioned inside the triangle 130.

Incidentally, there is a possibility that it is necessary to shift the positions of the spring units 108A, 108B, and 108C for a reason such as a change in the specifications of the digital camera 10. In such a case, the modulus of elasticity of at least one of the compression coil spring 110A, 110B, or 110C is adjusted. Further, the range 146 may be set to a range in which damping performance equivalent to the damping performance of the compression coil springs 110A, 110B, and 110C against the shutter unit 24, in a case where the compression coil springs 110A, 110B, and 110C are disposed such that the respective first directions intersect with each other at the intersection P or the centroid G (see FIGS. 6, 7, and 10), is exhibited.

Figure 11:
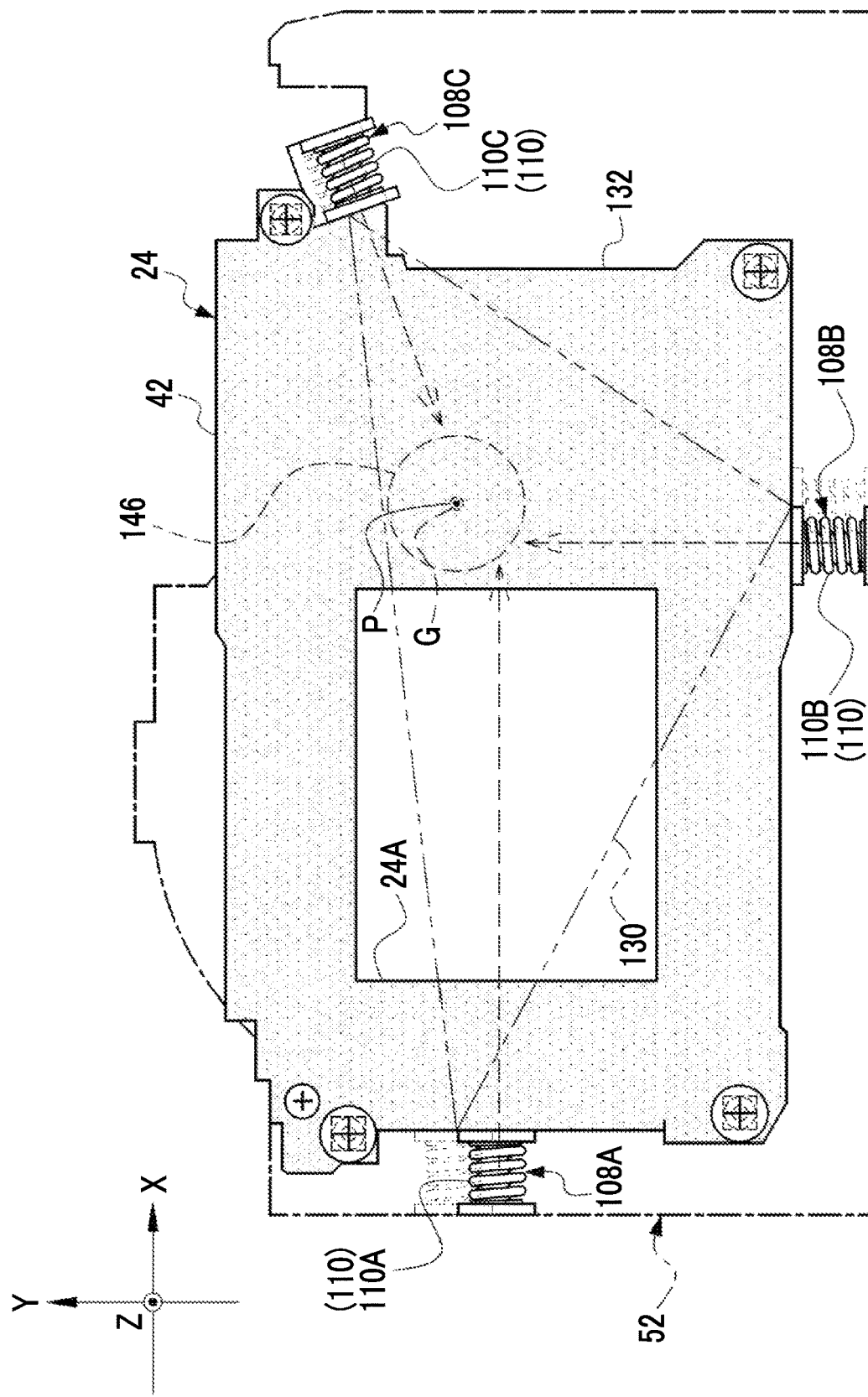
FIG. 11 is a schematic back view showing an example of the configuration of the front frame and the shutter unit in a case where an aspect in which the shutter unit is pressed by three compression coil springs from the outer periphery of the shutter unit toward a predetermined range, which includes a centroid, in a state where the shutter unit is mounted on the front frame is viewed from the back side of the digital camera.

Therefore, according to this configuration (an example shown in FIG. 11), as compared to a case where the arrangement of the compression coil springs 110A, 110B, and 110C is changed without the adjustment of a modulus of elasticity, it is possible to realize damping performance equivalent to the damping performance of the compression coil springs 110A, 110B, and 110C against the shutter unit 24 in a case where the compression coil springs 110A, 110B, and 110C are disposed such that the respective first directions intersect with each other at the intersection P or the centroid G and to improve the degree of freedom in the layout of components in the digital camera 10, even though the arrangement of at least one of the compression coil spring 110A, 110B, or 110C is changed.

Further, sponge has been exemplified as the friction materials 64, 66, 68, and 70 in the above-mentioned embodiment, but the technique of the present disclosure is not limited thereto. For example, a member made of a resin having elasticity and viscosity may be used together with a member made of sponge or instead of a member made of sponge. Examples of the member made of a resin include a member made of silicone rubber, a urethane rubber member, and the like. Furthermore, the number of friction materials is not limited. Moreover, the surface, which is in contact with the front surface 41 of the shutter unit 24, of at least one of the friction material 64, 66, 68, or 70 may be made of a material having a friction coefficient higher than the friction coefficient of sponge.

Moreover, the compression coil spring 110 has been exemplified in the above-mentioned embodiment, but the technique of the present disclosure is not limited thereto. A spring other than the compression coil spring 110 may be applied together with the compression coil spring 110 or instead of the compression coil spring, a member made of rubber may be applied, or an elastic member having at least elasticity of elasticity and viscosity may be applied.

The description contents and shown contents having been described above are the detailed description of portions according to the technique of the present disclosure, and are merely an example of the technique of the present disclosure. For example, the description of the configuration, functions, actions, and effects having been described above is the description of examples of the configuration, functions, actions, and effects of the portions according to the technique of the present disclosure. Accordingly, it goes without saying that unnecessary portions may be deleted or new elements may be added or replaced in the description contents and shown contents described above without departing from the scope of the technique of the present disclosure. Further, the description of common technical knowledge and the like, which allow the technique of the present disclosure to be embodied and do not need to be particularly described, is omitted in the description contents and shown contents, which have been described above, to avoid complication and to facilitate the understanding of portions according to the technique of the present disclosure.

In this specification, "A and/or B" is synonymous with "at least one of A or B". That is, "A and/or B" may mean only A, may mean only B, or may mean a combination of A and B. Further, in this specification, the same meaning as "A and/or B" is applied even in a case where three or more items are expressed to be connected using "and/or".

All documents, patent applications, and technical standards disclosed in this specification are incorporated in this specification by reference such that the incorporation of each of the documents, the patent applications, and the technical standards by reference is specific and is as detailed as that in a case where the documents, the patent applications, and the technical standards are described individually.

What is claimed is:

1. An imaging device that includes a shutter unit including a shutter adjusting an amount of subject light incident on an image sensor through an imaging optical system, the shutter unit being mounted on a frame, the imaging device comprising:

at least three or more elastic members, wherein the at least three or more elastic members are disposed on an outer periphery of a contour of the shutter unit in a front view and press the shutter unit from the frame to support the shutter unit, each of the at least three or more elastic members is elastically deformed in a first direction that is a direction in which each of the at least three or more elastic members presses the shutter unit from the frame and a second direction that is a direction perpendicular to the first direction, the first directions of the at least three or more elastic members intersect with each other at a specific spot inside the contour, the specific spot is one spot inside the contour, and the one spot is a spot that coincides with a centroid of the shutter unit in the front view, or is a centroid of the shutter unit.

2. The imaging device according to claim 1, wherein the at least three or more elastic members are disposed at spots that form a polygon of which vertices correspond to respective positions of the at least three or more elastic members, and the specific spot is positioned inside the polygon.

3. The imaging device according to claim 2, wherein an interval between adjacent vertices of the polygon is an interval less than 180° in a circumferential direction around the specific spot in the front view.

4. The imaging device according to claim 1, further comprising:

a shake correction mechanism that moves the image sensor in a plane perpendicular to an optical axis of the imaging optical system to correct a shake, wherein the shake correction mechanism is mounted on the frame.

5. The imaging device according to claim 1, wherein the imaging optical system is capable of being mounted on the frame, and the imaging optical system includes a vibration-proof lens that is moved in a plane perpendicular to an optical axis of the imaging optical system to correct a shake.

6. The imaging device according to claim 1, wherein elastic forces of the at least three or more elastic members in the first direction are larger than elastic forces of the at least three or more elastic members in the second direction.

7. The imaging device according to claim 1, wherein the shutter unit is supported from a side of the outer periphery by the at least three or more elastic members in a state where the shutter unit is oscillatable against elastic forces of the at least three or more elastic members.

8. The imaging device according to claim 1, wherein the first direction of at least one elastic member of the at least three or more elastic members coincides with a vertical direction in a case where the imaging device picks up an image in a standard posture.

9. An imaging device that includes a shutter unit including a shutter adjusting an amount of subject light incident on an image sensor through an imaging optical system, the shutter unit being mounted on a frame, the imaging device comprising:

at least three or more elastic members, wherein the at least three or more elastic members are disposed on an outer periphery of a contour of the shutter unit in a front view and press the shutter unit from the frame to support the shutter unit, each of the at least three or more elastic members is elastically deformed in a first direction that is a direction in which each of the at least three or more elastic members presses the shutter unit from the frame and a second direction that is a direction perpendicular to the first direction, the first directions of the at least three or more elastic members intersect with each other at a specific spot inside the contour, the at least three or more elastic members are disposed between the frame and the shutter unit on the outer periphery in a state where the at least three or more elastic members are compressed in the first direction in a case where a position of the shutter unit is a reference position, and an amount of elastic deformation of the at least three or more elastic members in a case where the position of the shutter unit is the reference position is equal to or larger than a movable distance of the shutter unit.

10. The imaging device according to claim 9,
wherein a moving distance of the shutter unit in a vertical direction in a case where the imaging device picks up an image in a standard posture is equal to or less than the movable distance of the shutter unit.

11. The imaging device according to claim 1,
wherein the shutter unit includes a rotating member,
the rotating member is connected to the shutter and is rotated to open and close the shutter,
a rotational force caused by rotation of the rotating member is applied to the shutter unit, so that the shutter unit oscillates in the second direction, and
elastic forces of the at least three or more elastic members are set to elastic forces that allow an oscillation amplitude of the shutter unit in the second direction to be less than a maximum oscillation amplitude of the shutter unit in the second direction.

12. The imaging device according to claim 1,
wherein the shutter is a focal plane shutter.

13. The imaging device according to claim 1,
wherein at least one of the at least three or more elastic members is a compression coil spring.

14. The imaging device according to claim 1, further comprising:
a holding mechanism that holds positions of end portions of the elastic members.

15. The imaging device according to claim 14,
wherein the holding mechanism includes a first fastener and a first engaging member to be engaged with the first fastener,
one of the first fastener and the first engaging member is provided on one of the frame and a first end portion of the elastic member, and
the other of the first fastener and the first engaging member is provided on the other of the frame and the first end portion.

16. The imaging device according to claim 14,
wherein the holding mechanism includes a second fastener and a second engaging member to be engaged with the second fastener,
one of the second fastener and the second engaging member is provided on one of the shutter unit and a second end portion of the elastic member, and
the other of the second fastener and the second engaging member is provided on the other of the shutter unit and the second end portion.

17. The imaging device according to claim 1, further comprising:
a friction material that is interposed between the frame and the shutter unit and regulates misregistration between the frame and the shutter unit with a friction force.

18. An imaging device that includes a shutter unit including a shutter adjusting an amount of subject light incident on an image sensor through an imaging optical system, the shutter unit being mounted on a frame, the imaging device comprising:
at least three or more elastic members,
wherein the at least three or more elastic members are disposed on an outer periphery of a contour of the shutter unit in a front view and press the shutter unit from the frame to support the shutter unit,
each of the at least three or more elastic members is elastically deformed in a first direction that is a direction in which each of the at least three or more elastic members presses the shutter unit from the frame and a second direction that is a direction perpendicular to the first direction,
the first directions of the at least three or more elastic members intersect with each other at a specific spot inside the contour,
the specific spot is a predetermined range inside the contour, and
the predetermined range is a range in which damping performance equivalent to damping performance of the at least three or more elastic members against the shutter unit, in a case where the specific spot is a centroid, is exhibited by adjustment of a modulus of elasticity of at least one elastic member of the at least three or more elastic members.

19. A shake suppression method applied to an imaging device that includes a shutter unit including a shutter adjusting an amount of subject light incident on an image sensor through an imaging optical system, and at least three or more elastic members, the shutter unit being mounted on a frame, the shake suppression method comprising:
disposing the at least three or more elastic members on an outer periphery of a contour of the shutter unit in a front view;
causing the at least three or more elastic members to press the shutter unit from the frame to support the shutter unit;
causing each of the at least three or more elastic members to be elastically deformed in a first direction that is a direction in which each of the at least three or more elastic members presses the shutter unit from the frame and a second direction that is a direction perpendicular to the first direction;
causing the first directions of the at least three or more elastic members to intersect with each other at a specific spot inside the contour, wherein
the specific spot is one spot inside the contour, and
the one spot is a spot that coincides with a centroid of the shutter unit in the front view, or is a centroid of the shutter unit.

* * * * *